US007886049B2

(12) United States Patent
Adelstein et al.

(10) Patent No.: US 7,886,049 B2
(45) Date of Patent: Feb. 8, 2011

(54) EXTENSIBLE SOFTWARE TOOL FOR INVESTIGATING PEER-TO-PEER USAGE ON A TARGET DEVICE

(75) Inventors: Frank N. Adelstein, Ithaca, NY (US); Judson Powers, Ithaca, NY (US); Robert A. Joyce, Ithaca, NY (US); Derek Bronner, Chittenango, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 161 days.

(21) Appl. No.: 12/190,314

(22) Filed: Aug. 12, 2008

(65) Prior Publication Data

US 2009/0165142 A1 Jun. 25, 2009

Related U.S. Application Data

(60) Provisional application No. 61/016,262, filed on Dec. 21, 2007.

(51) Int. Cl.
*G06F 15/16* (2006.01)
*G06F 15/173* (2006.01)

(52) U.S. Cl. ........................ 709/224; 709/217; 709/223

(58) Field of Classification Search ................. 709/223, 709/224, 217; 726/26
See application file for complete search history.

(56) References Cited

U.S. PATENT DOCUMENTS

2002/0073204 A1* 6/2002 Dutta et al. ................. 709/227
2004/0039921 A1* 2/2004 Chuang ...................... 713/187
2005/0203921 A1* 9/2005 Newman et al. ............ 707/100
2006/0167855 A1* 7/2006 Ishikawa et al. ............... 707/3
2006/0248525 A1* 11/2006 Hopkins ..................... 717/177

OTHER PUBLICATIONS

Adelsterin, Frank et al, "File Marshal: Automatic extraction of peer-to-peer data," Jun. 16, 2007, Digital Investigation 4S S43-S48, "http://www.sciencedirect.com".*

Frank Adelstein and Robert A. Joyce, "File Marshal: Automatic extraction of peer-to-peer data," Digital Investigation 4S (2007) S43-S48, www.sciencedirect.com, Aug. 14, 2007, 6 pgs.

(Continued)

*Primary Examiner*—Larry Donaghue
*Assistant Examiner*—Brian J Gillis
(74) *Attorney, Agent, or Firm*—Shumaker & Sieffert, P.A.

(57) ABSTRACT

In general, the invention provides for analyzing a target computer for computer crimes such as illegal sharing of files or sharing of illegal files on peer-to-peer clients. The target computer may have software for a plurality of peer-to-peer clients. Only one extensible forensic device may be necessary to analyze the plurality of peer-to-peer clients for downloaded or shared files. For example, the invention may provide for a method comprising determining whether one or more peer-to-peer clients are or have been installed on a target device by identifying information associated with one or more peer-to-peer modules, wherein each module is associated with a different one of the one or more peer-to-peer clients. The method further includes, gathering usage information for the one or more peer-to-peer clients that had been determined to be installed on the target computer, analyzing the usage information, and automatically generating a report of the analyzed usage information.

26 Claims, 16 Drawing Sheets

OTHER PUBLICATIONS

Carla Marceau et al., "A peer-to-peer architecture for secure data storage with query," in the *Proceedings of the SPIE Defense Transformation and Network-Centric Systems 2005*, Mar. 28-31, 2005, Orlando, FL, 12 pgs.

Dr. Rob Joyce et al., "Peer-to-Peer File Marshal," http://www.dfrws.org/2007/proceedings/p43-adelstein_pres.pdf, DFRWS 2007, Pittsburgh, Pennsylvania, Aug. 14, 2007, 11 pgs.

* cited by examiner 80 82 84

```
<?xml version="1.0" encoding="UTF-8"?>
<ClientConfig xmlns=
     "http://www.atc-nycorp.com/filemarshal/acquisitionconfig/2007/01"
     version="0.8">
 <!-- Generic name -->
 <Network>Gnutella</Network>
 <!-- Specific instance name -->
 <Namc>LimcWirc Pro</Namc>
 <Version>2.3b</Version>
 <Module>com.atc_nycorp.filemarshal.module.limewire</Module>

 <InstallationArtifacts>
  <Directory name="Program Files/LimeWire"/>
  <File name="Program Files/LimeWire/LimeWire.exe"
      md5="9fe8ed98b63ca6ac4dabf15025482916"
      version="4.12.11" />
  <File name="Program Files/LimeWire/LimeWire.jar"
      md5="0b27fda0142b4b9559f936a9c3ebbdb8" />
 </InstallationArtifacts>

 <UsageArtifacts>
  <!-- Acquirc modc -->
  <Data type="config" name="limewire.props" path="$FM_USER/.limewire" />
  <Data type="log" name="createtimes.cache" path="$FM_USER/.limewire" />
  <Data type="cache" path="$FM_USER/.limewire/fileurns.cache" />
  <Data type="log" path="$FM_INSTALL/install.log" />
  <Data type="cache" path="$FM_USER/.limewire/gnutella.net" />
  <Data type="shared" path="$FM_USER/Shared" />
  <Data type="shared" path="$SYSTEMROOT/limewire" />
 </UsageArtifacts>

</ClientConfig>
```

FIG. 4

EXTENSIBLE SOFTWARE TOOL FOR INVESTIGATING PEER-TO-PEER USAGE ON A TARGET DEVICE

This application claims priority from U.S. Provisional Application Ser. No. 61/016,262 filed Dec. 21, 2007, the entire content of which is incorporated herein by reference.

STATEMENT REGARDING FEDERALLY SPONSORED RESEARCH OR DEVELOPMENT

This invention was made with Government support under Contract 2006-DN-BX-K013 with the National Institute of Justice (NIJ). The Government may have certain rights in this invention.

TECHNICAL FIELD

The invention relates to computer forensics and, more particularly, to techniques for analyzing computer forensic evidence relating to peer-to-peer file sharing network software on a target device.

BACKGROUND

Computer forensics is the application of computer investigation and analysis techniques to identify and capture potential evidence that is stored, installed, or otherwise maintained within a computing device. The evidence might be sought during an investigation for a wide range of potential computer crimes, including theft of trade secrets, theft of service, theft of or destruction of intellectual property, fraud, hacking, illegal sharing of files, sharing of illegal files, and other criminal or misuse activities. Unlike paper evidence, computer evidence can exist in many forms, with earlier versions and even some deleted versions of the evidence still accessible on a storage medium. Forms of computer evidence may include, for example, system log files, executing processes, stored files and the like.

An investigator may draw on an array of methods to discover and capture evidence from a computer device. One common method for obtaining computer evidence is on-site inspections or seizure of the computer. Another common method for obtaining computer evidence is to create a copy or image of the target computer. The investigator may physically connect an analysis device to the target computer, physically connect an analysis device to the copy of the target device, or load analysis software on the target device to acquire and analyze the computer evidence.

Illegal sharing of files, such as copyrighted music, or sharing of illegal files, such as child pornography, is often performed via a network capable of implementing one or more peer-to-peer (P2P) file sharing protocols implemented by a P2P client. In networks capable of implementing one or more P2P file sharing protocols via a P2P client, peers are able to directly share files. With respect to computing devices used by the peers, investigators are particularly interested in configuration parameters and usage information such as user name, password, times of use, time of install, log files of any transactions, the downloaded (or shared) files themselves, peers/servers, and the like, stored on the computing device.

Analyzing parameters on computing devices used by peers typically requires an investigator to gather, categorize, and analyze all of the parameters by hand due at least in part to the large number of different P2P file sharing protocols and P2P clients and differing characteristics and technologies. In addition, the investigator may need to obtain some secondary software (beyond the investigator's normal tools) for each different P2P file sharing protocol or P2P client to translate a log or cache file for the respective P2P file sharing protocol into a human-readable format.

SUMMARY

In general, the invention is directed to a computer forensic system for retrieval and analysis of computer evidence on a target device. The computer forensic system includes a forensic device that allows a user, such as an investigator, to interrogate the target device in order to collect and analyze computer evidence that may be stored or installed on the target device. The forensic device allows the investigator to extract and analyze data from peer-to-peer (P2P) clients. A P2P client is a software module on a computing device that is capable of implementing a P2P file sharing protocol. The forensic device comprises an extensible software tool that automates the tedious and time-consuming task of searching for and analyzing data from P2P clients while maintaining the integrity of the forensics examination.

The software tool executing on the forensic device provides a framework that automatically analyzes the target device to detect any of a plurality of different P2P clients. That is, the software tool is configured to analyze registry information, organization of files and directories, directories themselves or other resources of the target device to detect a "fingerprint" of any of the P2P clients, thereby determining which P2P clients are currently or have previously been installed on the target device. Upon detection of P2P clients, the software tool performs deep inspection on the target device to extract configuration and usage information for each of the P2P clients such as a list of contacted peers and/or servers and files that were shared or downloaded, to name a few examples of configuration and usage information. For clarity, the term peer servers will be used herein to refer to peers and/or servers. The software tool maintains and provides a detailed audit trail of all performed functions to maintain the forensic integrity of the examination.

The software tool provides an extensible, scalable framework that can be used to support forensic analysis for a wide variety of different P2P clients, where each P2P client is capable of implementing a particular P2P file sharing protocol. The software tool can be programmed with modules such as plug-ins and configuration files to specify the particular details of a P2P client for a particular type of P2P file sharing protocol to be supported by the forensic software tool. Additionally, the software tool is fully extensible in that as new P2P file sharing protocols are deployed by a P2P client or as current P2P file sharing protocols are modified, the software tool may be updated to detect and provide forensic analysis of the target computer with respect to the new P2P clients or P2P clients with changed P2P file sharing protocols without modification to the underlying forensic analysis and reporting framework. This provides the advantage of needing only one forensic device executing the software tool described herein to extract and analyze a plurality of P2P clients, where each P2P client may have different characteristics and may be configured differently based on the P2P file sharing protocol.

In one embodiment, the invention is directed to a computer-readable medium comprising instructions that cause one or more programmable processors to determine whether one or more peer-to-peer clients are or have been installed on a target device by identifying information associated with one or more peer-to-peer modules, wherein each module is associated with a different one of the one or more peer-to-peer clients. The instructions further cause one or more programmable processors to gather usage information for the one or more peer-to-peer clients that had been determined to be installed on the target device. The instructions also cause the one or more programmable processors to analyze the gathered usage information for the one or more peer-to-peer clients that had been determined to be installed on the target device. The instructions also cause the one or more programmable processors to generate a report of the analyzed gathered usage information for the one or more peer-to-peer clients.

In another embodiment, the invention is directed to a method. The method includes determining, by a forensic system that includes a target device, whether one or more peer-to-peer clients are or have been installed on the target device by identifying information associated with one or more peer-to-peer modules, wherein each module is associated with a different one of the one or more peer-to-peer clients. The method further includes gathering usage information, by the forensic system, for the one or more peer-to-peer clients that had been determined to be installed on the target device, and analyzing the gathered usage information, by the forensic system, for the one or more peer-to-peer clients that had been determined to be installed on the target device. The method also includes generating a report of the analyzed gathered usage information, by the forensic system, for the one or more peer-to-peer clients.

In yet another embodiment, the invention is directed to a forensic system. The forensic system includes a forensic device coupled to a target device, and a software tool, stored on the forensic device. The software tool extracts and analyzes data from the target device. The software tool determines whether one or more peer-to-peer clients are or have been installed on the target device, gathers usage information for the one or more peer-to-peer clients that had been determined to be installed on the target device, analyzes the gathered usage information for the one or more peer-to-peer clients that had been determined to be installed on the target device, and generates a report of the analyzed gathered usage information for the one or more peer-to-peer clients.

In still yet another embodiment, the invention is directed to a forensic device. The forensic device comprises an analysis control module configured to extract and analyze data for one or more peer-to-peer clients that are or have been installed on a target device. The forensic device further comprises one or more peer-to-peer plug-ins that interface the analysis control module to the one or more peer-to-peer clients. The forensic device also includes one or more configuration files comprising data details for the one or more peer-to-peer clients. The forensic device further comprises a storage unit that stores the extracted and analyzed data from the analysis control module. Each peer-to-peer plug-in interfaces the analysis control module to one of the one or more peer-to-peer clients. Each configuration file comprises data details for one of the one or more peer-to-peer clients. Each configuration file is associated with one of the one or more peer-to-peer plug-ins.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 is an exemplary block diagram of an embodiment of one of P2P plug-in.

FIG. 4 is an exemplary illustration of one of configuration files.

DETAILED DESCRIPTION

Figure 1:
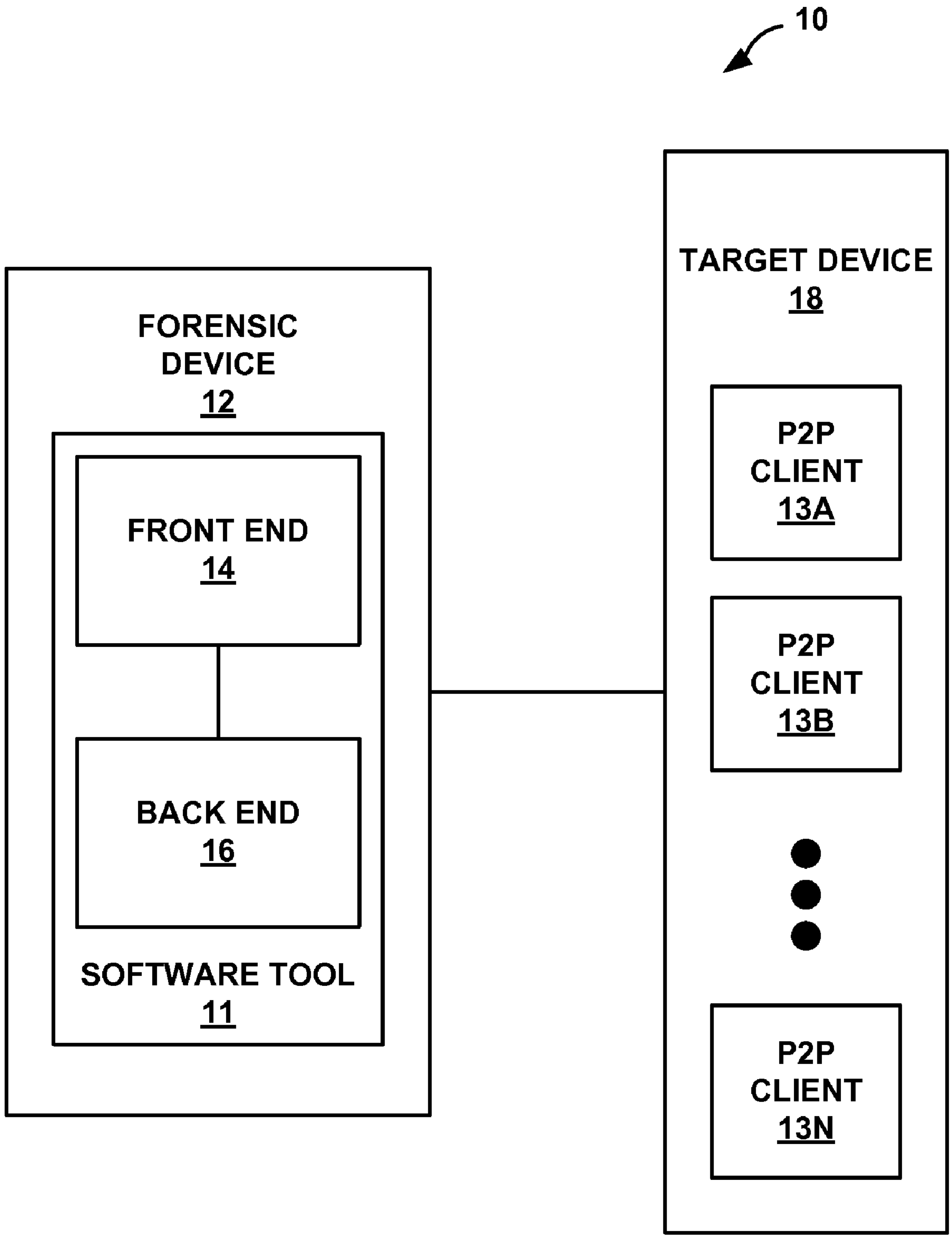
FIG. 1 is a block diagram illustrating an exemplary computer forensic system for retrieval and analysis of computer evidence.

FIG. 1 is a block diagram illustrating an exemplary forensic system 10 for retrieval and analysis of computer evidence. System 10 comprises a forensic device 12 coupled to a target device 18. One or more peer to peer (P2P) clients 13A-13N (collectively referred to as P2P clients 13) for P2P file sharing protocols may be currently stored or installed on target device 18. One or more P2P clients 13 may also have been previously stored or installed on target device 18, and subsequently removed.

In some embodiments, target device 18 is any type of computing device such as a network server, a desktop computer, a laptop computer, a personal digital assistant (PDA), or a handheld device. In other embodiments, forensic device 12 may be directly coupled to a hard drive or other non-volatile memory storage that has been removed from of a target device 18. In yet other embodiments, forensic device 12 may be directly coupled to an image or copy of a hard drive or other non-volatile memory storage of the target computing device 18. Generally, it is considered better to use an image or copy of the hard drive rather than the original hard drive so as to reduce the risk of accidental manipulation of data stored on the original.

Forensic device 12 may be any type of device capable of investigating target device 18. For example, forensic device 12 may be a desktop computer, a laptop computer, a personal digital assistant (PDA), or a handheld device. In some embodiments, forensic device 12 comprises a software tool 11 capable of investigating target device 18. In such embodiments, software tool 11 is stored on a storage medium within forensic device 12. In other embodiments, software tool 11 may be stored on a removable computer readable storage medium that is external to forensic device 12, such as an external disk drive, memory stick, universal serial bus (USB) drive, a CD or DVD. In such embodiments, forensic device 12 executes software tool 11 from the removable storage medium. In the high-level diagram of FIG. 1, software tool 11 is shown as including a front end 14 and a back end 16. Front end 14 represents software associated with controlling all interaction with an investigator that is investigating target device 18. For example, front end 14 may provide a graphical user interface for presenting information to the investigator. Front end 14 may format the data received from target device 18 for generation of reports or other output mechanisms for presenting the data to the investigator. Back end 16 represents the underlying framework that provides the analysis functions for searching the files, directories, registry files, and the like for information regarding P2P clients.

Forensic device 12 and target device 18 may be coupled to each other in various manners. For example, in one embodiment, forensic device 12 may be directly coupled to target device 18 through one or more ports on forensic device 12 connected directly to target device 18. In another embodiment, forensic device 12 may be coupled to target device 18 via a network such as the Internet, an intranet, or a local area network (LAN). This allows forensic device 12 to interrogate target device 18 without the need to actually seize target device 18. Forensic device 12 may interrogate target device by, for example, obtaining an Internet Protocol (IP) address within the subnet scope of the LAN to which target device 18 is connected. Forensic device 12 may obtain the IP address either dynamically via a protocol such as Dynamic Host Configuration Protocol (DHCP) or statically via configuration by a network administrator. In yet another embodiment, forensic device 12 may be coupled to computing device 18 via a wireless network. Forensic device 12 may be coupled to target device 18 via various other techniques known in the art. In yet another embodiment, forensic device 12 may be directly coupled to an image of the hard drive or memory storage of target device 18. In yet another embodiment, software tool 11 may be stored and executed on target device 18. In such embodiments, forensic device 12 and target device 18 may be part of the same device. In yet another embodiment, software tool 11 may be stored on a computer readable storage medium, such as an external hard drive, memory stick, USB disk, CD, or DVD, to name a few examples. In such embodiments, target device 18 may execute software tool 11 stored on the computer readable storage medium. In this embodiment, forensic device 12 and target device 18 may be part of the same device.

Figure 2:
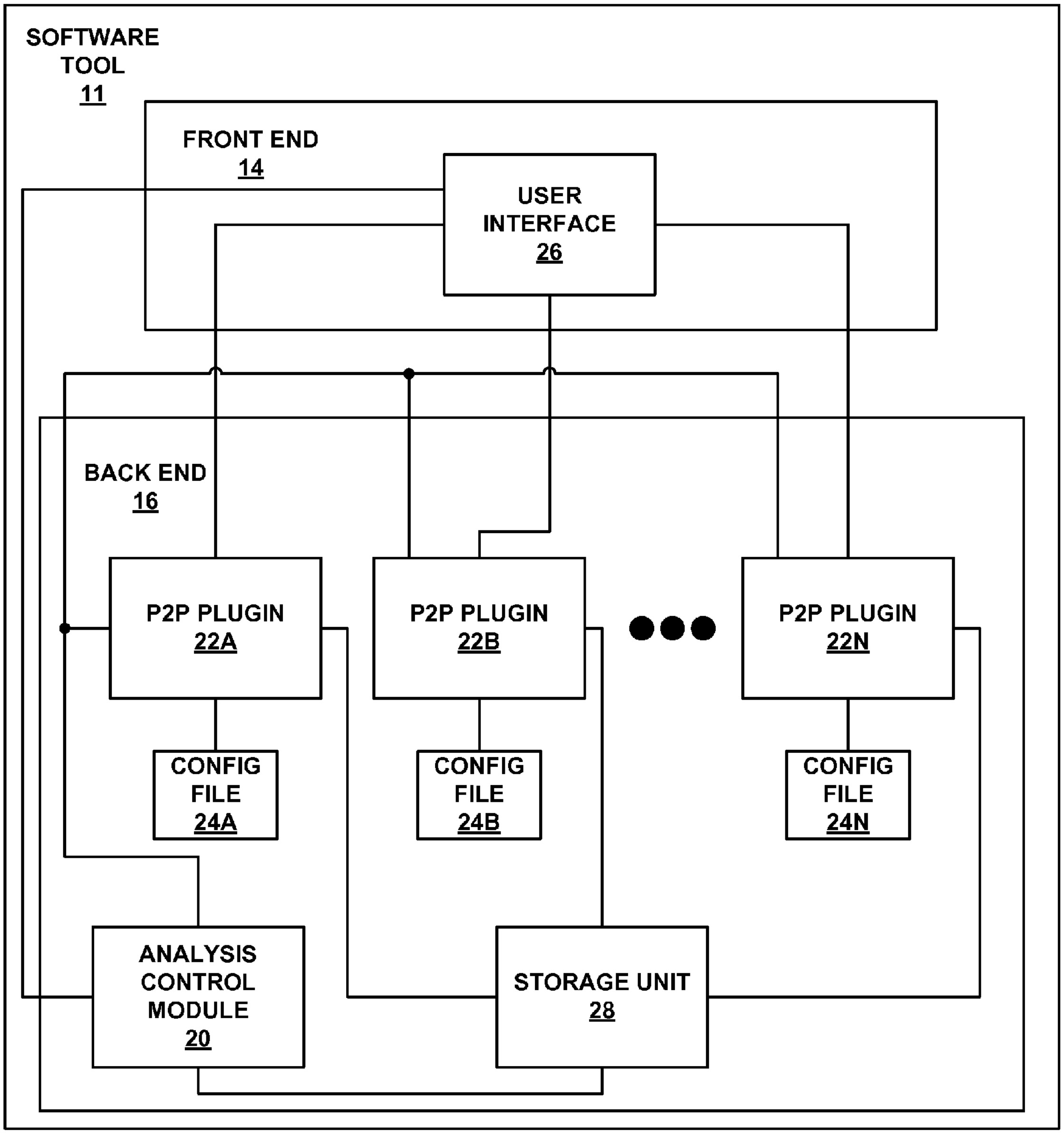
FIG. 2 is a block diagram illustrating an exemplary software tool for retrieval and analysis of computer evidence.

FIG. 2 is a block diagram illustrating an exemplary software tool 11 for retrieval and analysis of computer evidence. In this example, front end 14 includes user interface 26 that formats the data such that it may be readable by an investigator. Back end 16 provides a framework for seamless installation and operation of P2P plug-in modules 22A-22N (collectively referred to as P2P plug-ins 22) and respective configuration files 24A-24N (collectively referred to as configuration files 24). In addition, back end 16 includes analysis control module 20 and storage unit 28. Analysis control module 20 provides a forensic analysis engine that may be dynamically configured by P2P plug-ins 22 to retrieve and analyze registry information, organization of files and directories, directories themselves and other resources of target device 18 (FIG. 1). Based on the configuration provided by each of P2P plug-ins 22, analysis control module 20 operates to detect a “fingerprint” for target device 18 for any of the P2P file sharing protocols or P2P clients, thereby determining which P2P clients are currently or have previously been installed on target device 18. Upon detection of P2P clients, analysis control module 20 performs further inspection on target device 18 under the direction of P2P plug-ins 22 to extract configuration and usage information for each of the P2P file sharing protocols or P2P clients. For example, analysis control module 20 may extract a list of contacted peer servers and files that were shared or downloaded for each of the P2P clients detected on target device 18. The term “extract” as used herein means to access or to acquire.

User interface 26 provides the investigator with information about each P2P client that analysis control module 20 detects on target device 18. User interface 26 may, for example, display to the investigator how a particular P2P client was used by target device 18. User interface 26 may display to the investigator summary information about the P2P clients, shared files, and log entries. For example, user interface 26 may provide the investigator with a list of specific P2P clients that are or were at one time stored or installed on target device 18. User interface 26 may provide the investigator details about where the P2P client is stored or installed, what version is stored or installed, and whether the P2P client was fully or partially installed. Partially installed P2P clients may be P2P clients that were once stored or installed on target device 18 but have been at least partially deleted or uninstalled.

In one embodiment, each one of P2P plug-ins 22 may be associated with a particular type of P2P client for a different type of P2P file sharing protocol. In another embodiment, each one of P2P plug-ins 22 may be associated with more than one type of P2P client. In yet another embodiment, more than one of P2P plug-ins 22 may be associated with a particular type of P2P client. Each one of P2P plug-ins 22 are associated with a respective one of configuration files 24 that provides and/or specifies configuration data, rules, parameters and all other information necessary to dynamically configure analysis control module to correctly detect and extract information from target device 18 for the corresponding P2P network. P2P plug-ins 22 also provides and/or specifies configuration data, rules, parameters and all other information necessary for user interface 26 to format, render and display any information unique to a particular P2P client.

In this way, each of P2P plug-ins 22 allow analysis control module 20 to perform forensic analysis of target device 18 with respect to a corresponding P2P file sharing protocol or P2P client. Moreover, such analysis for the disparate P2P file sharing networks or P2P client can be performed as an integral part of forensic software tool 11 without leaving the context and integrity provided by and maintained by the forensic software tool 11, i.e., without requiring invocation of additional third-party tools. In this manner software tool 11 is fully extensible so that when new P2P files sharing networks are deployed or current P2P file sharing networks are modified, software tool 11 can easily be updated with a new P2P plug-in module while the rest of software tool 11 may remain unchanged. Additionally, a P2P plug-in module may be modified to provide user interface 26 with specific information regarding a particular P2P client. For example, if a particular P2P client stored a list of files searched by the user, the P2P plug-in for that particular P2P client is updated so that the P2P plug-in controls user interface 26 to display the list of files searched by the user.

Figure 3:
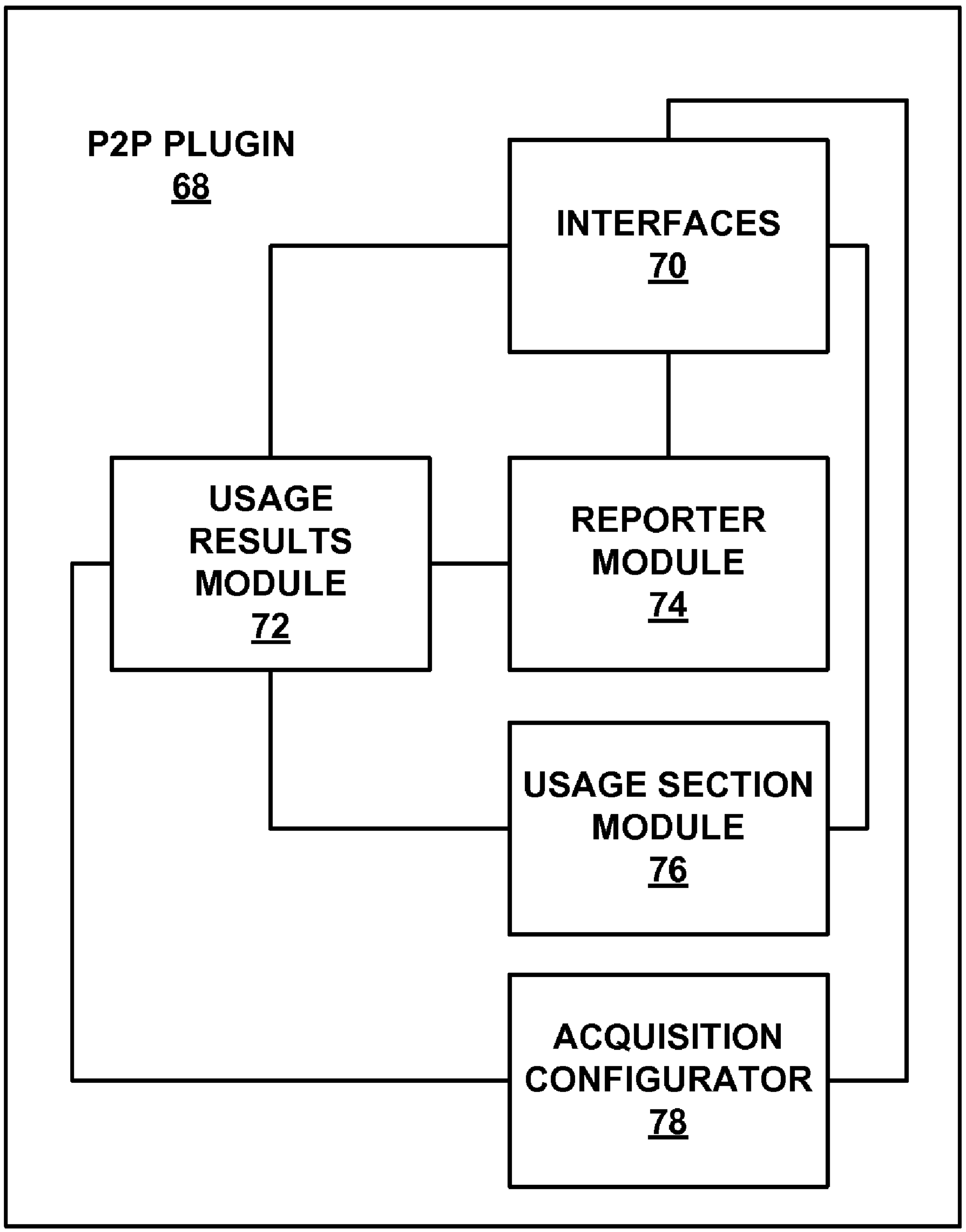

FIG. 3 is a block diagram that provides a general representation of an exemplary P2P plug-in 68, which generally represents one of P2P plug-ins 22 (FIG. 2). In the example of FIG. 2, P2P plug-in 68 includes a set of one or more interfaces 70, a usage results module 72, a reporter module 74, a usage section module 76, and an acquisition configurator module 78.

Interfaces 70 provides one or more interfaces that P2P plug-in 68 presents and utilizes for access and/or communication with configuration files 24, analysis control module 20, storage unit 28, and user interface 26. Interfaces 70 may, in one embodiment, conform to a universal interface specification that is common across all P2P plug-ins 22. In this way, plug-ins 22 and configuration files 24 can easily be installed in software tool 11 and/or modified to specify the particular details of a P2P client for a particular type of P2P file sharing network to be supported by forensic software tool 11 without modification to the underlying forensic analysis and reporting framework provided by the tool 11. For example, in one embodiment, interfaces 70 includes one or more interface definitions that define a standard interface through which P2P plug-in 68 communicates with, or is invoked by, other components of software tool 11, such as analysis control module 20, storage unit 28, and user interface 26. In this embodiment, the interface definitions provided by interfaces 70 define the interface for invoking the methods or functionality that is provided by usage results module 72, reporter module 74, usage section module 76, and acquisition configurator 78. Interfaces 70 may define the interface through which these modules are invoked by other components within software tool 11 or by interfaces 70 directly. In this fashion, interfaces 70 provides a standard interface definition through which functionality of each P2P plug-in, such as plug-in 68, is defined for a specific P2P file sharing network.

Usage results module 72 represents a software component of P2P plug-in 68 that receives and processes usage data from analysis control module 20. There are at least four types of usage data: shared, log, setup, and cache files or directories. Based on its internal knowledge of the specific P2P client, usage results module 72 parses and stores forensic data in storage unit 28 (FIG. 2). Usage results module 72 may provide, for example, lists of shared or download files, peer servers, log entries, and other client-specific information to either analysis control module 20 or user interface 26.

Reporter module 74 receives the forensic data from usage results module 72 and processes the forensic data to construct a print or viewable representation of the data from usage results module 72 based on information requested by the respective one of configuration files 24 to be reported. Exemplary format and organization of configuration files 24 is described in detail below.

Usage section module 76 receives data from usage results module 72. Usage section module 76 may construct a representation of the data provided by usage results module 72. One example technique of constructing a representation of data provided by usage results module 72 is to use Eclipse Standard Widget Tool (SWT) widgets. Other techniques may also be used. Acquisition configurator module 78 may be optional. In some embodiments where acquisition configurator module 78 is used, acquisition configurator module 78 may receive data from usage results module 72 for every phase of operation of software tool 11. Based on the information, acquisition configurator module 78 may dynamically construct or modify one of configuration files 24.

Referring back to FIG. 2, configuration files 24 may provide P2P plug-ins 22 with particular details of a P2P client. For example, configuration files 24 may comprise a plurality of data fields that provide P2P plug-ins 22 with particular items to be searched for on the target device that constitute evidence that the P2P client is or was installed on the target device. In some embodiments, one of P2P plug-ins 22 may dynamically create one of configuration files 24 or expand a current one of configuration files 24. The data within one of configuration files 24 may be changed based on the particular task that one of P2P plug-ins 22 performs. Configuration files 24 may be an extensible markup language (XML) file with three sections: client data, installation artifacts, and usage artifacts, which may be considered to be data fields.

Client data within the configuration file may specify details about a specific P2P client that is to be detected, for example the name and version of the P2P client, and an identification of one of the P2P plug-ins 22 installed within software tool 11 for detecting and gathering forensic evidence for the particular P2P client.

In general, installation artifacts within the configuration file describes how to detect whether a particular type of P2P client is currently installed or was installed on target device 18. In one example, installation artifacts of the configuration file may specify three distinct types of data that are required to detect and indicate a positive match of the presence of a particular type of P2P client on the target device 18. For example, detection for the presence of a specific directory may be specified within the configuration file by a <Directory> XML tag and a corresponding directory name, or may be specified by a <File> XML tag and a corresponding file name. Optionally, the particular file may also be required to have a given cryptographically secure hash algorithm, such as a Message-Digest algorithm 5 (MD5). In this way, the name, location, and contents of a particular file to detect can be specified, as described below. Detection for the presence of a specific registry entry within the target device may similarly be specified by the <Registry> tag within the configuration file. Optionally, the configuration file may further specify that the presence of a specified value for the registry entry may be required within target device 18 before it is positively determined that the corresponding P2P client is or was installed on target device 18. Each item in this section may be associated with a comma-separated list specifying particular versions or version ranges required for the associated item.

In this way, installation artifacts may specify the path locations for files, directories, and registry keys that, when present on target device 18, indicate that the particular P2P client is currently, or have been previously, stored or installed. Some P2P clients may require more or fewer installation artifacts. As mentioned, for any of the files, a cryptographically secure hash algorithm, such as MD5 hash, may be specified so as to detect an exact match on the content of the file in addition to its name. The MD5 hash may be associated with a version attribute in the configuration file to indicate that binary hash value for the file is for detecting a specific version of the P2P client.

Usage artifacts within the configuration file specifies types of subfiles on target device 18 from which forensic data is to be captured by the software tool 11 upon positively detecting the particular P2P client on target device 18. Examples of four types of subfiles include: log, setup, cache, and shared files, and directories. The subfiles are specified by the usage artifacts and analyzed when software tool 11 detects that the particular P2P client associated with the corresponding P2P plug-in 22 is or had been installed on target device 18, as described below. Usage artifacts within the configuration data describe the locations of P2P client-specific configuration and usage information client on target device 18.

FIG. 4 is an exemplary illustration of one of configuration files 24. In the example of FIG. 4, configuration files 24 include client data 80, installation artifacts 82, and usage information 84. Client data 80 may specify, for example, the type of P2P network (e.g., Gnutella, shown in the example of FIG. 4), a name of a specific P2P client for the P2P network (e.g., LimeWire Pro, shown in FIG. 4), and version of the specific P2P client. Installation artifacts 82 specifies the location of the P2P client files to be detected, and may include, a cryptographically secure hash algorithm number, such as a MD5 hash number, for the specific P2P client and version. For example, installation artifacts 82 may specify registry entries, files, and directories associated with a particular P2P client. In some embodiments, installation artifacts 82 may also specify the version or range of version of the P2P file sharing protocol or P2P client. After software tool 11 detects a particular P2P client, software tool 11 utilizes usage information 84 of the configuration data to determine the location of any setup, cache, log, or shared files and directories that are to be processed during the forensic analysis. In the example of FIG. 4, usage information 84 specifies a config location for configuration data of the P2P client as (or previously) installed on target device 18. As used herein, in terms of describing parts of one of configuration files 24, "config" and "setup" may be used interchangeably with respect to P2P client-specific configuration data to be analyzed on target device 18. It is important to note that the term "config" within usage information 84 specifies attributes for configuration data with respect the P2P client as installed (or previously installed) on target device 18 that is to be processed during forensic analysis, and this does not refer to configuration files 24 of software tool 11 (FIG. 2).

Referring back to FIG. 2, analysis control module 20 provides a framework for selectively invoking each of P2P plug-ins 22 via their universal interfaces (e.g., interfaces 70). By way of communication with each of P2P plug-ins 22 through their universal interfaces, analysis control module 20 receives instructions and configuration data in a generalized form that allows analysis control module 20 to determine which P2P clients are currently or were previously stored or installed on target device 18. Analysis control module 20 may search for the presence of files, directories, registry keys and values, to name a few, based on instructions received from each of P2P plug-ins 22 via the universal interfaces presented by the plug-ins. Upon detection of a P2P client, analysis control module 20 may compare the path locations of the files, directories, and registry keys and values to those stored in configuration files 24 (by way of interaction with P2P plug-ins 22). In one embodiment, when searching and analyzing registry files, analysis control module 20 may perform an offline analysis. By using documentation of the registry file format found at another location, such as a web site location, for example, http://home.eunet.no/pnordahl/ntpasswd/WinReg.txt, a library supporting parsing and interpreting registry files may be generated. The results from the library may be verified using a function on forensic device 12, such as, for example, a regedit function. The library routines may support enumerating keys and subkeys, their values, the type associated with each value, and the data content of each value. Additionally, the library routines may support looking up a key by name, retrieving the modification time (mtime) and the access control list (ACL) associated with a key. The library may also examine alternate or backup registry files, in case some of the keys had been purged from the active registry of target device 18 when target device 18 was seized and imaged. Checking alternate or backup registry files may provide greater flexibility with detecting the presence of P2P clients.

If all evidence collected by analysis control module 20 matches the installation artifacts of one of configuration files 24, then the corresponding P2P plug-in outputs a message to analysis module 20 indicating an affirmative match. In response, analysis control module 20 may then engage user interface 26 to indicate to the investigator that the specific P2P client is fully installed, according to one embodiment. If only some of the evidence collected by analysis control module 20 matches the installation artifacts of one of the configuration files 24, then analysis module 20 may direct user interface 26 to indicate to the investigator that the P2P client is partially installed. If none of the evidence collected by analysis control module 20 matches the installation artifacts stored on one of configuration files 24, then analysis control module 20 may log that the installation of a particular P2P client was checked, but that the particular P2P client was not installed on target device 18.

In this manner, software tool 11 of forensic device 12 is fully extensible. As new P2P clients are developed and utilized for cybercrimes, or as current P2P client software is modified, software tool 11 on forensic device 12 may be updated for the new P2P client or the modified P2P software without modification to the forensic analysis engine provided by analysis control module 20 or the user interface and reporting function of user interface 26. That is, software tool 11 on forensic device 12 need not be updated by installation of new P2P plug-ins 22 corresponding to the new P2P clients or modified P2P software. In other words, development, compilation and installation of a new software tool and/or purchase of a new forensic device is not necessary to perform forensic analysis on newly developed P2P clients or modified P2P software. Additionally, a plurality of P2P plug-ins 22 may require only one analysis control module 20, instead of a plurality of analysis control modules configured to only interface with a particular P2P client.

After determining which P2P clients are currently, or were previously, installed or stored on target device 18, analysis control module 20 may gather user-specific information for specific P2P clients. For each user, analysis control module 20 may gather setup and log files and directories specified in one of configuration files 24 from target device 18 to obtain forensically-relevant data maintained by the P2P client, including contacted servers, downloaded or shared files, and other forensically relevant data maintained by the P2P client.

Analysis control module 20 may output the gathered information to user interface 26 which may then display the information to the investigator. The investigator may be able to analyze details such as contents of the files, and sort data by various fields provided by user interface 26. User interface 26 may provide fields such as IP address of the server, date last contacted, and the like. The investigator may view the details of the downloaded files using an appropriate viewer such as using Acrobat for portable document format (PDF) files, Firefox for hypertext markup language (HTML) files, Photoshop for an image file, etc. Additionally, the investigator may search for files based on hashes or set of hashes in databases such as National Software Reference Library (NSRL) available at http://www.nsrl.nist.gov or the National Center for Missing and Exploited Children's (NMEC) databases, for example to see whether any of the downloaded files match files in the database. NMEC databases are only available to law enforcement. The investigator may also search for files based on the file name, file size, download and sharing status, modification time, user that downloaded or is sharing the file, and P2P client that downloaded or is sharing the file.

Analysis control module 20 may also log all operation it performs in an audit log and store the audit log in storage unit 28. Storage unit 28 may provide various types of storage such as a hard drive, removable data card, and the like. The audit log may be a very detailed, low-level information about the operations performed by analysis module 20. The audit log maintains the forensic integrity of the investigation by allowing investigators to verify exactly which actions were taken during the investigation. The audit log may also be useful to determine which actions were not taken so that subsequent investigators may be able to perform the actions previously not taken. The audit log may be an appropriate appendix to the overall report created by the investigator.

In addition to the audit log, analysis control module may also generate a summary report which may be stored in storage unit 28. The summary report may contain, for example, summaries of acquired data and results of saved searches. In some embodiments, the summary report may also include the audit log. The summary report may be in an HTML, PDF, or rich text format (RTF) format, but other types of file formats may also be used. The summary report may be easily inserted into the larger forensics report.

Analysis control module 20 may also hash the audit log and/or summary report and store it to storage unit 28. Analysis control module 20 may compute the hash for any acquired file. In another embodiment, the tool used to image or copy target device 18 may have already computed hashes for the files used by analysis control module 20. The creation of a hash increases the forensic integrity because analysis control module 20 may corroborate the files it processes with the generated hash. Hash algorithms may include MD5, Secure Hash Algorithm (SHA-1), and other hash algorithms known in the art.

Figure 5:
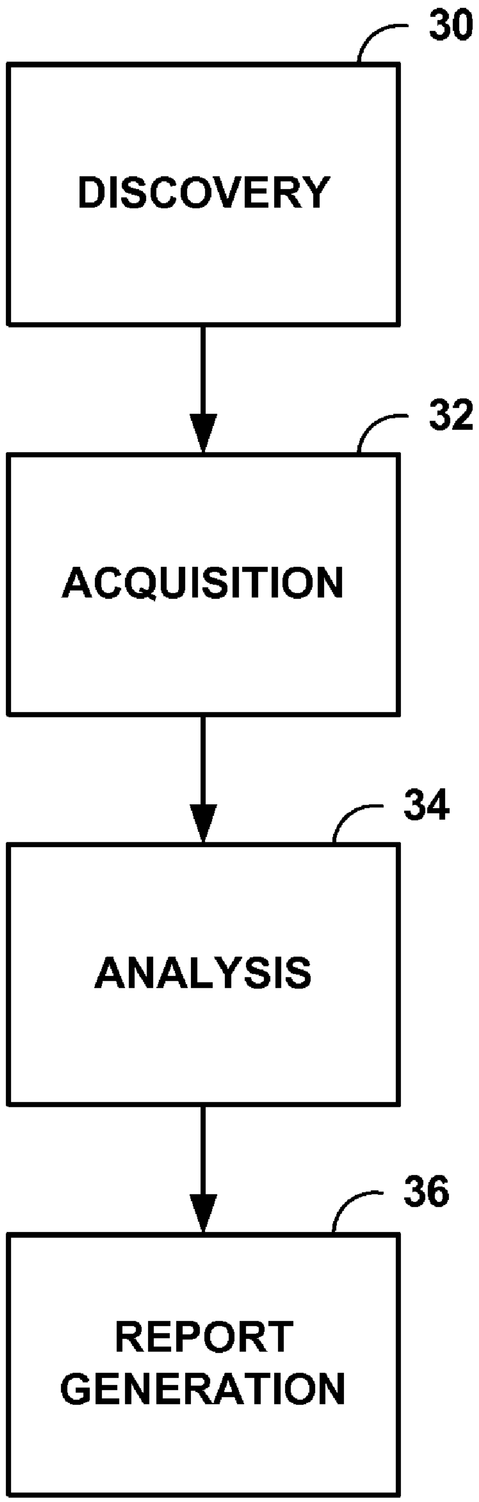
FIG. 5 is a flowchart illustrating exemplary operation of a computer forensic system in acquisition and analysis of computer evidence of a target device.

FIG. 5 is a flowchart illustrating exemplary operation of a forensic device 12 in acquisition and analysis of computer evidence of a target device 18. Forensic device 12 starts in the discovery phase (30) to determine which P2P clients are currently, or were previously, installed on target device 18. During the discovery phase, forensic device 12 may look for the presence of files, directories, and registry keys and values, and the like. In situations where the P2P client is deleted or uninstalled, the data directories and other artifacts may remain. Registry keys may also remain in situations in which the P2P client is deleted or uninstalled, or remain in backup versions of the registry. Files may be specified by the pathname. They may also be specified by a hash. Registry entries include keys, subkeys, values, their data, and the like. Software tool 11, running on forensic device 12, may search for particular files, directories, registry keys, and the like based on client data 80 of configuration files 24 associated with P2P plug-ins 22 that are associated with P2P clients.

Following the discovery phase (30), forensic device 12 may perform acquisition of the discovered files. During the acquisition phase (32), forensic device 12 may gather user-specific information for specific P2P clients. User-specific information may include setup and log information, including P2P clients contacted, files downloaded or shared, and other forensically-relevant data maintained by a specific P2P client. P2P plug-ins 22 may specify whether to use a prewritten one of configuration files 24 used in the discovery phase (30), or whether to construct, dynamically, configuration file 24. Dynamic configuration files 24 may use the discovery-phase file as a base, adding to it. Additionally, one of P2P plug-ins 22 may specify multiple acquisition phases, parsing data and writing a new configuration in between each phase.

Following the acquisition phase (32), forensic device 12 may analysis the acquired information. During the analysis phase (34), forensic device 12 may display the gathered information, and allow an investigator to view details, such as contents of files, and sort data by various fields such as IP number of server, date last contacted, and the like. Investigators may view the details in viewers such as Acrobat, Firefox, or Photoshop, for example.

Following the analysis phase (34), forensic device 12 may generate a forensic report of the analysis. Forensic device 12 may log all operations during the discovery phase (30), acquisition phase (32), and analysis phase (34). The log file may be very detailed, thus maintaining the forensic integrity of the investigation by providing which actions were performed, or not performed. Forensic device 12 may output the log file during the report generation phase (36). Forensic device 12 may also generate a summary report during the report generation phase (36). The summary report may not be as detailed as the log information and may be formatted to be included in the forensic report. The summary report may be in an HTML, PDF, or RTF file, but other file formats may also be used.

Figure 6:
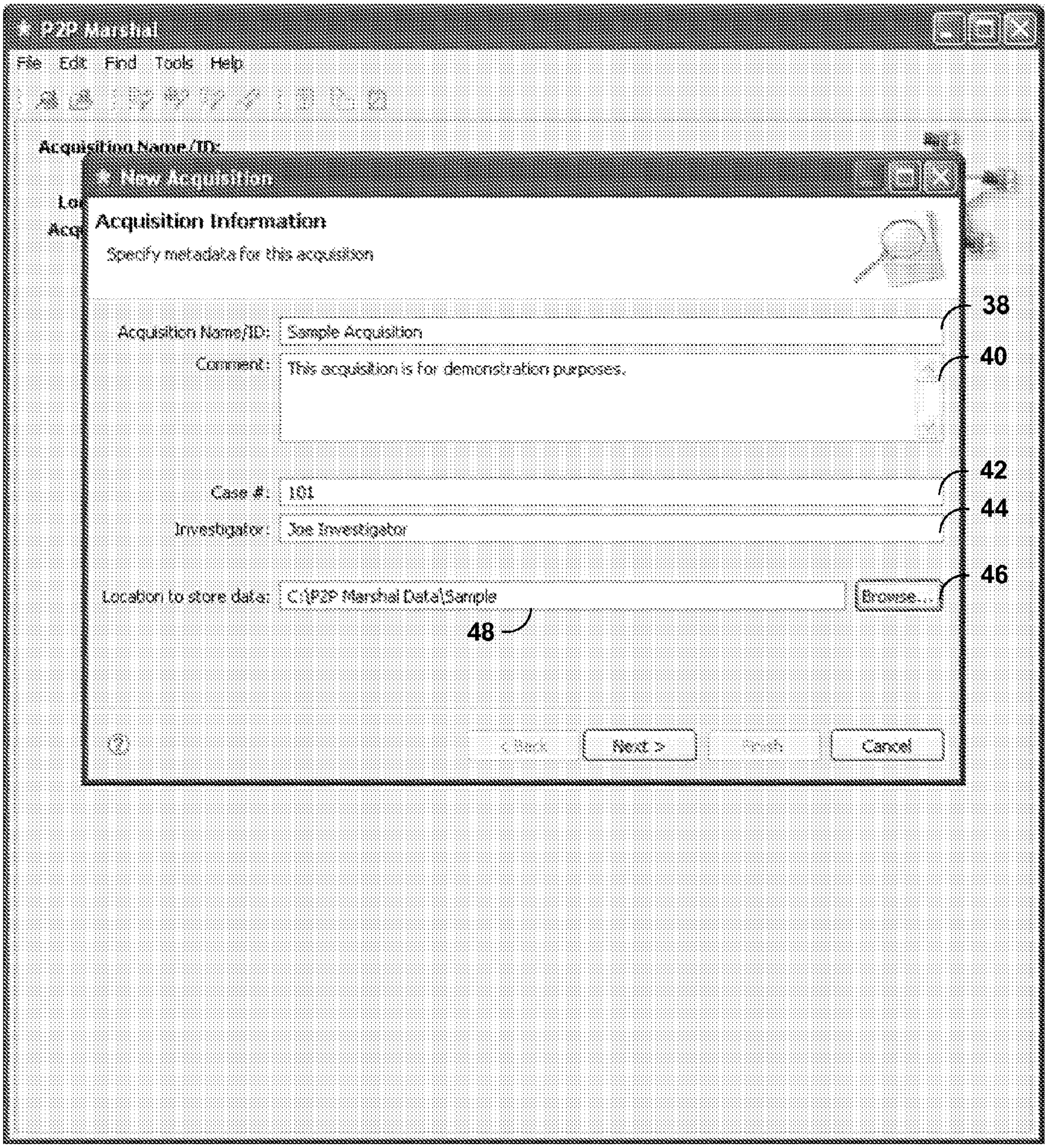
FIG. 6 is an exemplary user interface presented by the forensic device for discovering computer evidence on a target device.

FIG. 6 is an exemplary user interface presented by the forensic device 12 for discovering computer evidence on a target device 18. Forensic device 12 may provide an investigator with a user interface display for analyzing a target device 18. Forensic device 12 may provide, within user interface 26, the investigator with acquisition name/ID field 38, comment field 40, case number field 42, investigator name field 44, and location field 48. Forensic device 12 may provide an investigator with more or fewer options.

Acquisition name/ID field 38 may allow an investigator to apply an identifying name to the investigation. Comment field 40 may provide an investigator with the option of providing some comments about the acquisition, target device 18, and the like. Comment field 40 may not be populated in some instances. Case number field 42 may allow the investigator to specify the case number for investigation. Location field 48 may provide the investigator to specify where the analysis information is stored. The location may be typed in directly. Anew location may be generated for each target device 18. Location field 48 may be changed by using browse 46. Browse 46 may be a button on the user interface that allows the investigator to change the storing location. Browse 46 may also allow the investigator to specify a brand new storing location. The storage location may be on forensic device 12 or may be on an external memory storage unit such as an external hard drive, random access memory (RAM), and the like. After the acquisition name/ID field 38, comment field 40, case number field 42, and location field 48 fields are populated, forensic device 12 may provide the investigator with a user interface to provide the location of target device 18.

The investigator may open an existing investigation for target device 18. The investigator may use the acquisition name/ID field 38, case number field 42, location field 48, or other fields provided by forensic device 12 to open an existing investigation for target device 18. When subsequently opening an existing investigation, target device 18 may need to be connected to forensic device 12 in the same manner as it was connected before. This may be because data stored on target device 18 may not be copied onto forensic device 12.

Figure 7:
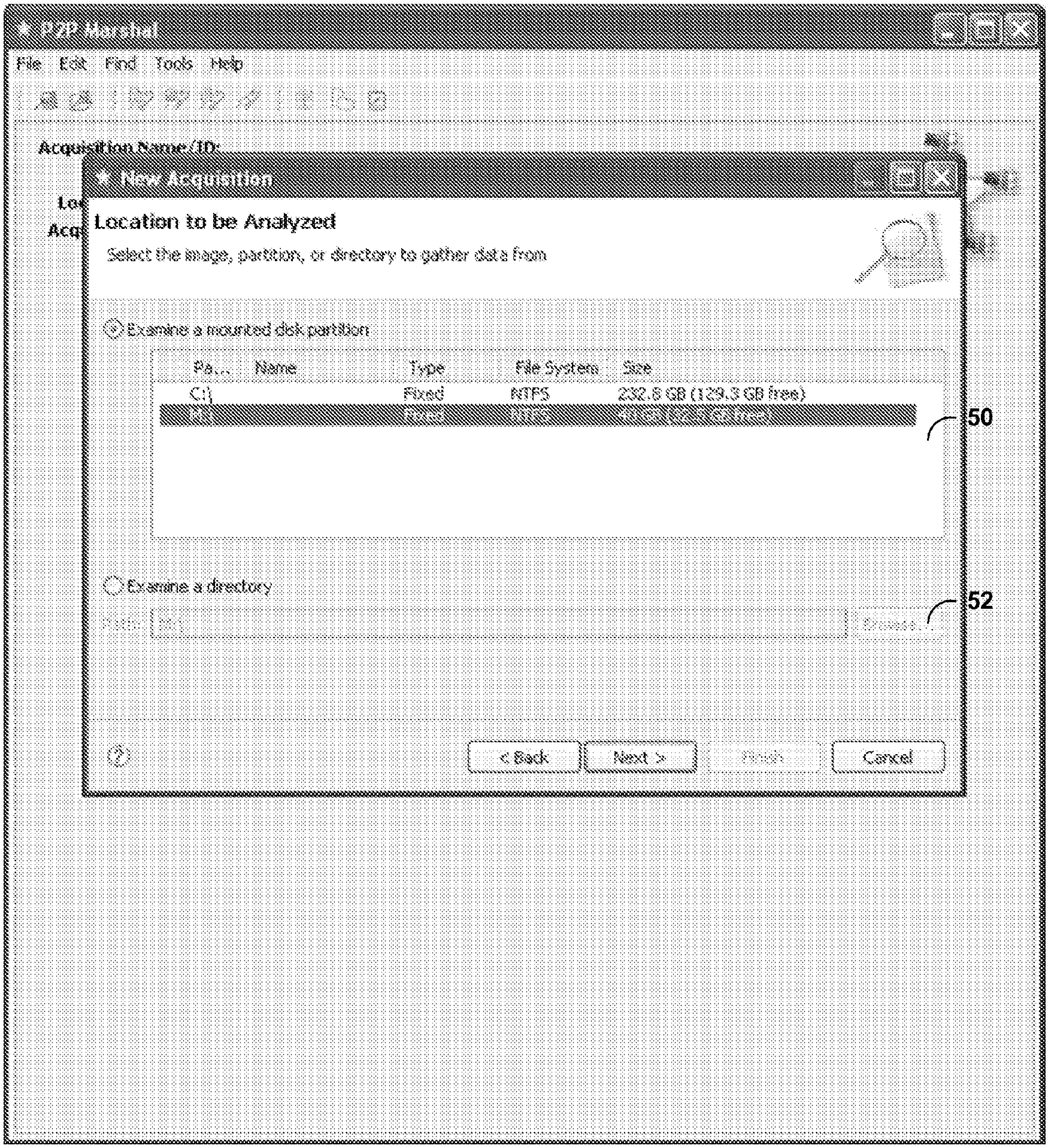
FIG. 7 is an exemplary user interface presented by the forensic device for selecting a target device.

FIG. 7 is an exemplary user interface presented by user interface 26 of forensic device 12 for selecting target device 18. Forensic device 12 may provide the investigator with the option to examine a mounted disk partition 50 or to examine a file directory 52.

Figure 8:
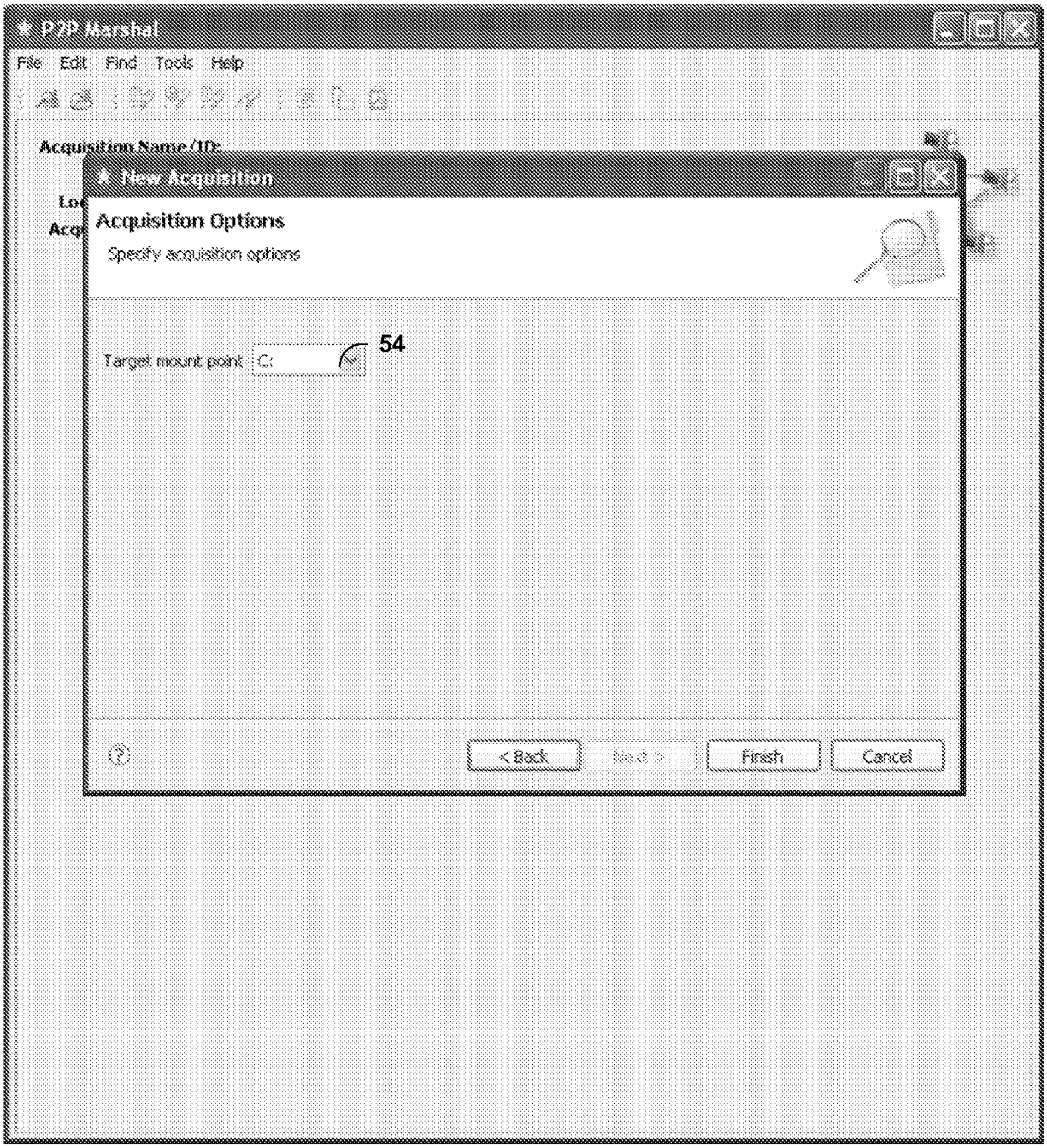
FIG. 8 is an exemplary user interface presented by the forensic device for inputting additional information that allows the forensic device to acquire and analyze data on a target device.

FIG. 8 is an exemplary user interface 26 presented by forensic device 12 for inputting additional information that allows forensic device 12 to acquire and analyze data on target device 18. As shown in FIG. 8, target mount point 54 may allow the investigator to select the original name of the location of the files and directories on target device 18 that need to be analyzed by forensic device 12. For example, the primary hard drive is generally labeled "C:". In one example, the hard drive is removed from target device 18 and attached to forensic device 12. In this example, the operating system of forensic device 12 may label the hard drive of target device 18 as "F:". Target mount point 54 allows the investigator to indicate that while the drive is labeled "F:", it was originally labeled "C:". As shown in the example of FIG. 8, the investigator may select target mount point 54 to be the C: drive. This means that, in this example, forensic device 12 will analyze the C: drive of target device 18. An investigator may also select "unknown" for target mount point 54, however this selection may limit the operation of forensic device 12. After selecting target mount point 54, forensic device 12 may provide the investigator with a user interface showing the analysis of the acquired P2P client information.

Figure 9:
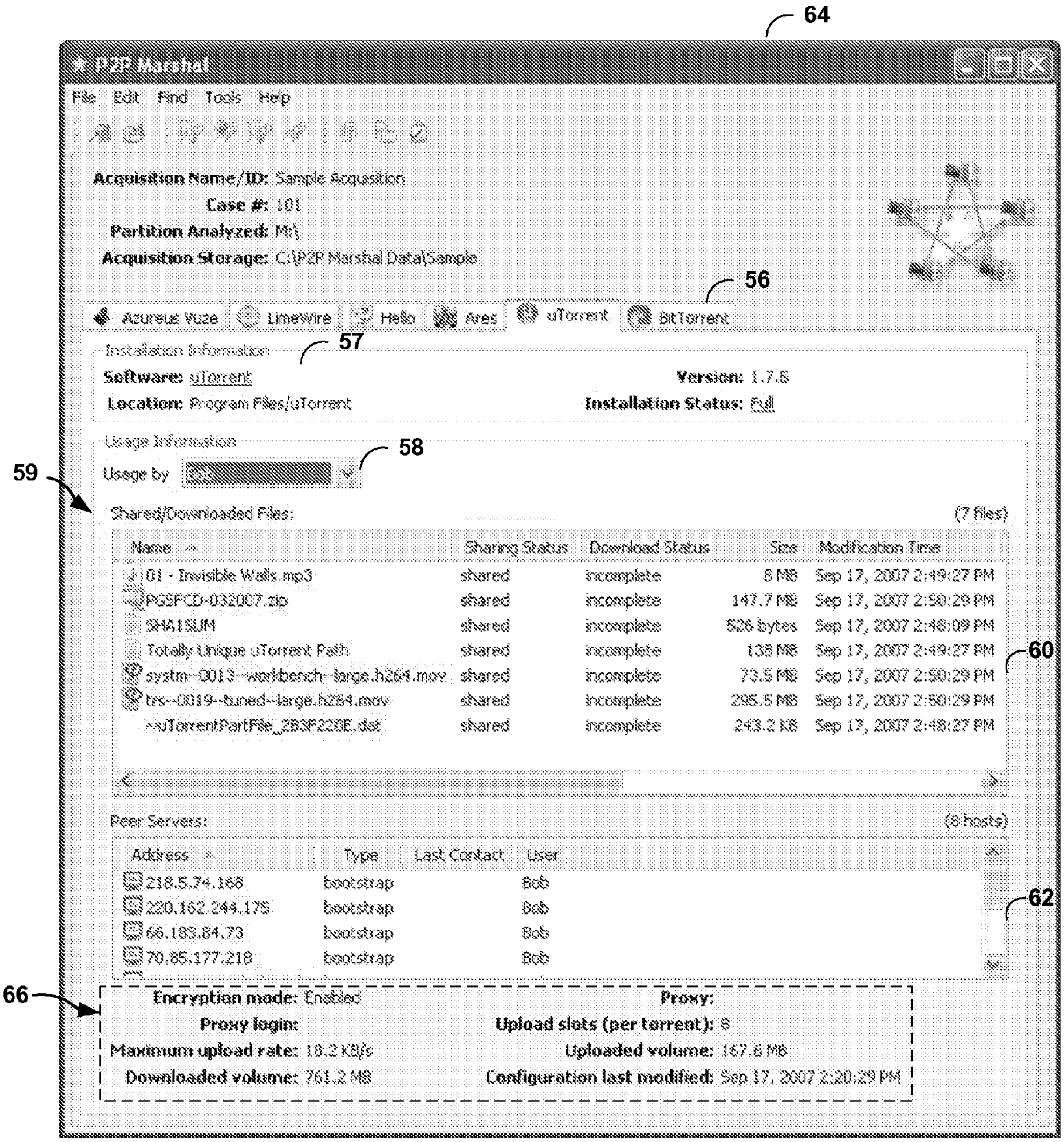
FIG. 9 is an exemplary user interface presented by the forensic device for analyzing the evidence on the target device.

FIG. 9 is an exemplary user interface 26 presented by forensic device 12 for analyzing the evidence on target device 18. Analysis output page 64 may include tabs 56, installation information 57, and usage information 59. Analysis output page 64 may include more or fewer sections. Tabs 56 may be one or more tabs for each P2P client currently stored or installed, or previously stored or installed, on target device 18. Selecting different tabs of tabs 56 selects different P2P clients. Each one of tabs 56 may be labeled with a specific P2P client name and may display the version number and the installation directory when one of tabs 56 is chosen. In some embodiments, the version number and installation directory may be displayed when a mouse within user interface 26 hovers over one of tabs 56.

Installation information 57 may provide the investigator with installation information for a P2P client. Installation information 57 may include software name, location, version, and installation status. Installation information 57 may provide the investigator with name, installation location, version, and installation status to name a few. Forensic device 12 may display the exact version, or otherwise it may display the range of versions that match the program. Moreover, installation information 57 may provide the investigator with an installation status with respect to a particular P2P file sharing protocol or P2P client. As one example, installation information 57 may indicate that the particular P2P file sharing protocol or P2P client has been partially or fully installed on target device 18. Installation information 57 may also provide the investigator with information that the particular type of P2P file sharing protocol or P2P client is not currently installed or stored on target device 18. An investigator may receive more information of the installation status by clicking on installation status within installation information 57. By clicking on installation status, the investigator may be provided with a display about the installation artifacts. This window may display the directories, files, and registry keys that forensic device 12 searched for to determine if a P2P client is present on target device 18. Installation artifacts will be described in more detail below.

As one example, usage information 59 includes a user name 58 that specifies one or more login identifiers for users of the target machine, any shared or downloaded files 60, and any peer servers 62. Usage information 59 may display how a particular P2P client was used. User name 58 may allow the investigator to select the name of a particular person being investigated. User name 58 may also be set to all users combined to display all information for every user regarding the P2P client. Shared or downloaded files 60 may display which files were shared by or downloaded on target device 18. Shared or downloaded files 60 may also display sharing status, download status, file size, last modification time, directory in which the file is located, and user associated with the file. In some embodiments, the download status in shared or downloaded files 60 may assume that a file is downloaded in instances where the file was found in a default directory but without any additional specific evidence. Shared or downloaded files 60 may assume that a file was downloaded based on, for example, when only a partial version of the file is downloaded, or when the file is saved in a different location. Clicking on a particular shared or downloaded file within shared or downloaded files 60 may launch a software program to view the particular file. Other techniques known in the art may also be used to view a particular file displayed in shared or downloaded files 60.

Peer servers 62 may include the name or IP address of any peer server found in the configuration or log files for a particular P2P client. Additional information may also be provided, for example the type of the node (often there are normal peer nodes and special nodes, called supernodes, trackers, etc. by the software), the last contact time, if available, and the user who communicated with the peer server.

Client usage information 66 may display more information about a P2P client. For example, some P2P clients maintain when the last session ended, the P2P client ID, and total connection and run time. Client usage information 66 may display this information for P2P clients when available. Client usage information 66 may include the client configuration and usage information which may include any information the P2P client chooses to store that is not presented in the other fields displayed in FIG. 9.

Figure 10:
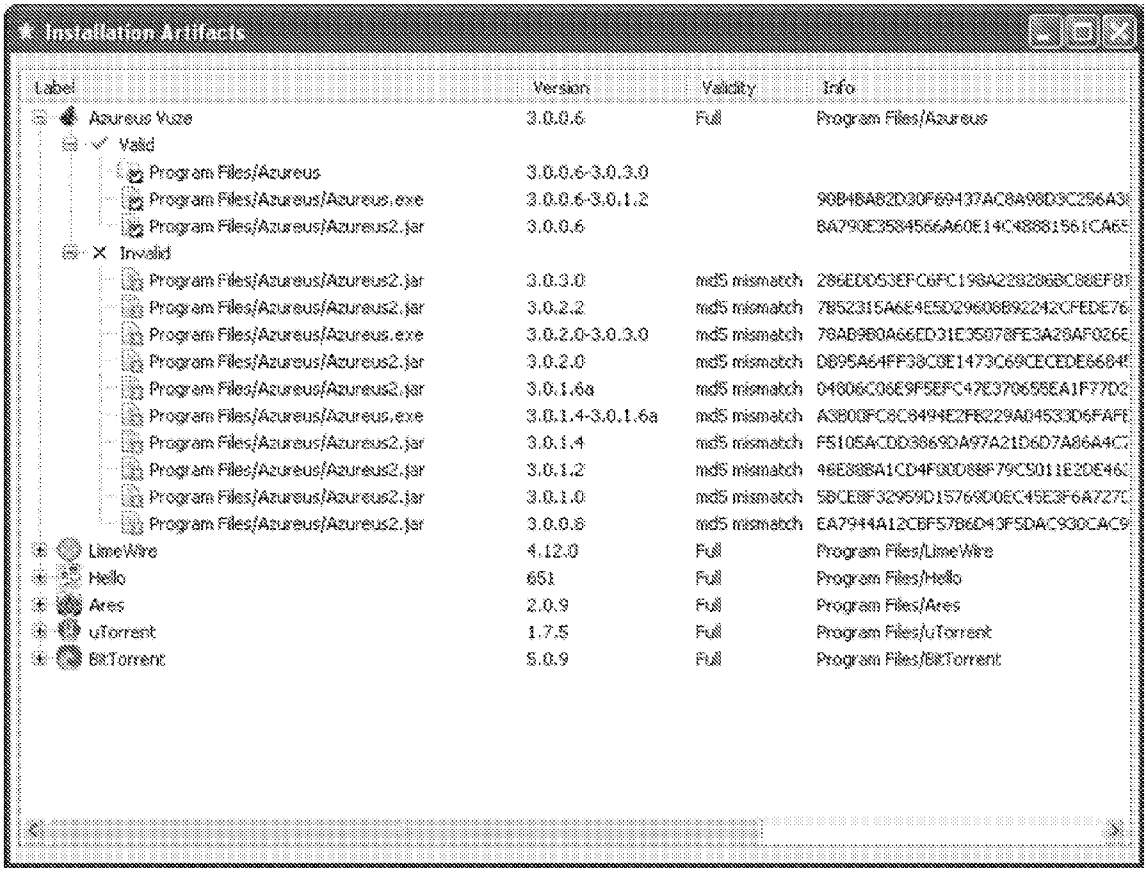
FIG. 10 is an exemplary output of installation artifacts that display to the investigator the directories, files, and registry keys that a forensic device searched for to determine if a P2P client is present on target device.

FIG. 10 is an exemplary output of the installation artifacts provided by user interface 26. Installation artifacts may display to the investigator the directories, files, and registry keys that forensic device 12 searched for to determine if a P2P client is present on target device 18. Positively-identified items may be listed under the "Valid" section for a particular P2P client, as well as the version or range of versions associated with that item. Items that are not positively identified may be listed under "Invalid." Directories and registry entries may be valid if they are present and may be invalid if they are not present. Files may have a specified cryptographically secure hash algorithm, such as a MD5, SHA-1, SHA-256, and the like that serve to identify different software versions. If a file is present but the cryptographically secure hash algorithm of that file does not match the specified value, it may be listed as invalid with a note, such as "md5 mismatch," or SHA-1 mismatch. If the file is not present at all, the note may be "not present." Each valid file will likely have multiple invalid entries that are mismatches. If there are many entries for a file that are mismatches and no corresponding valid entry, the file may be from a version of the software that forensic device 12 does not recognize.

Figure 11A:
FIGS. 11A and 11B are exemplary user interfaces presenting portions of an audit log generated by the forensic device.
Figure 11B:
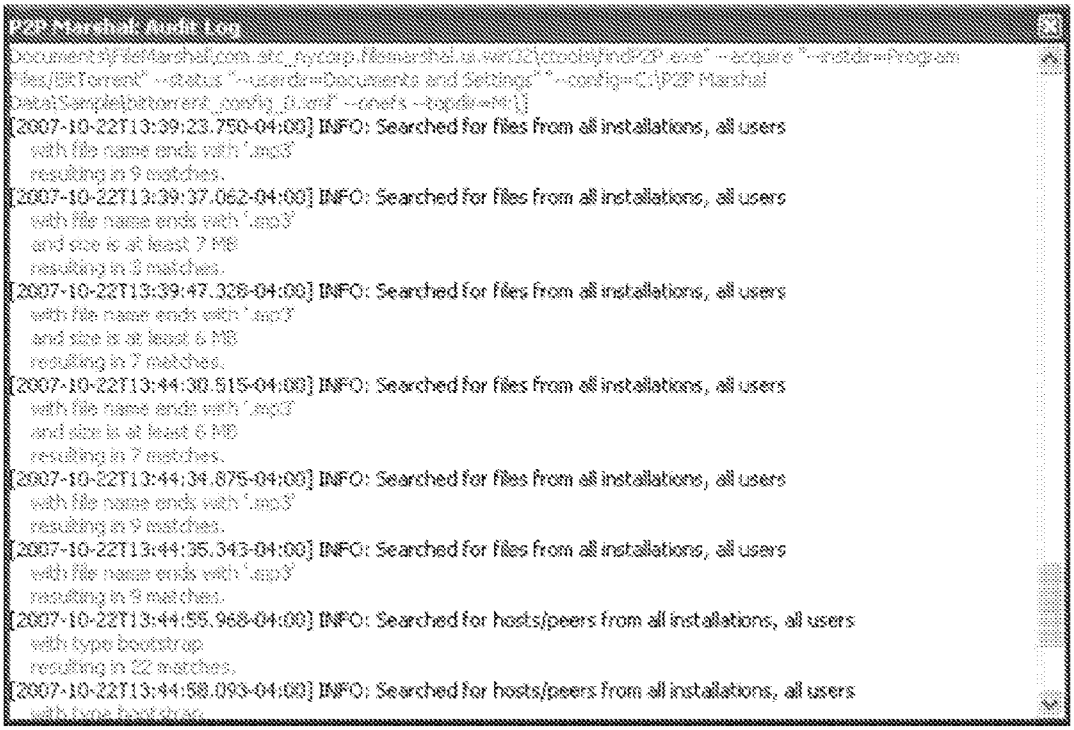

FIGS. 11A and 11B are exemplary user interfaces 26 illustrating an audit log generated by forensic device 12 showing the creation of a new acquisition and the searches performed by forensic device 12, respectively. Each entry in the log may consist of a timestamp in blue, followed by a short description of the action in black, followed by a detailed description of the action (and possibly the command that was executed, if appropriate), in gray.

After the analysis is completed, the investigator may generate a report of the findings. To generate a report the investigator may designate the name of the report, select what information may need to be in the report, and select which searches need to be included.

Figure 12:
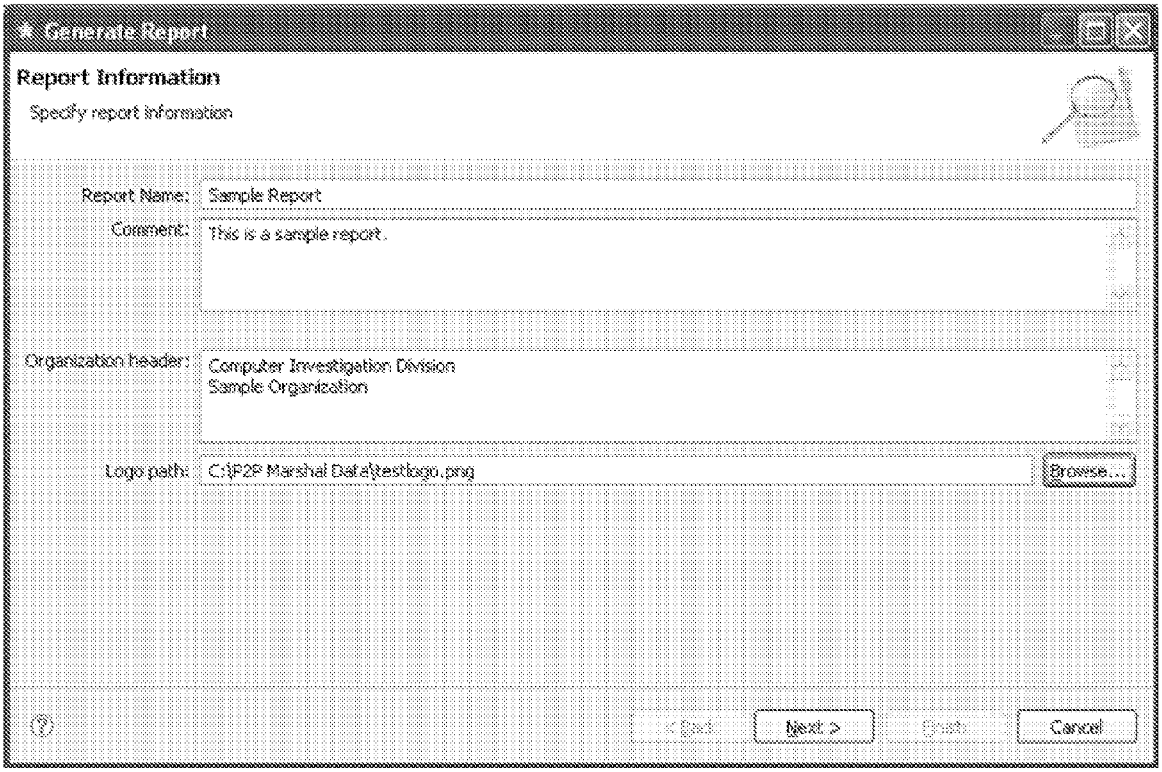
FIGS. 12-14 are exemplary user interfaces presented by the forensic device when the user generates a new report.

FIG. 12 is an exemplary user interface 26, of report information for generating a report. The investigator may type in the name of the report, and any optional comments. These may appear on the cover page of the report. The investigator may also include, optionally, text and a logo image that may be included in the header on the report's title page.

Figure 13:
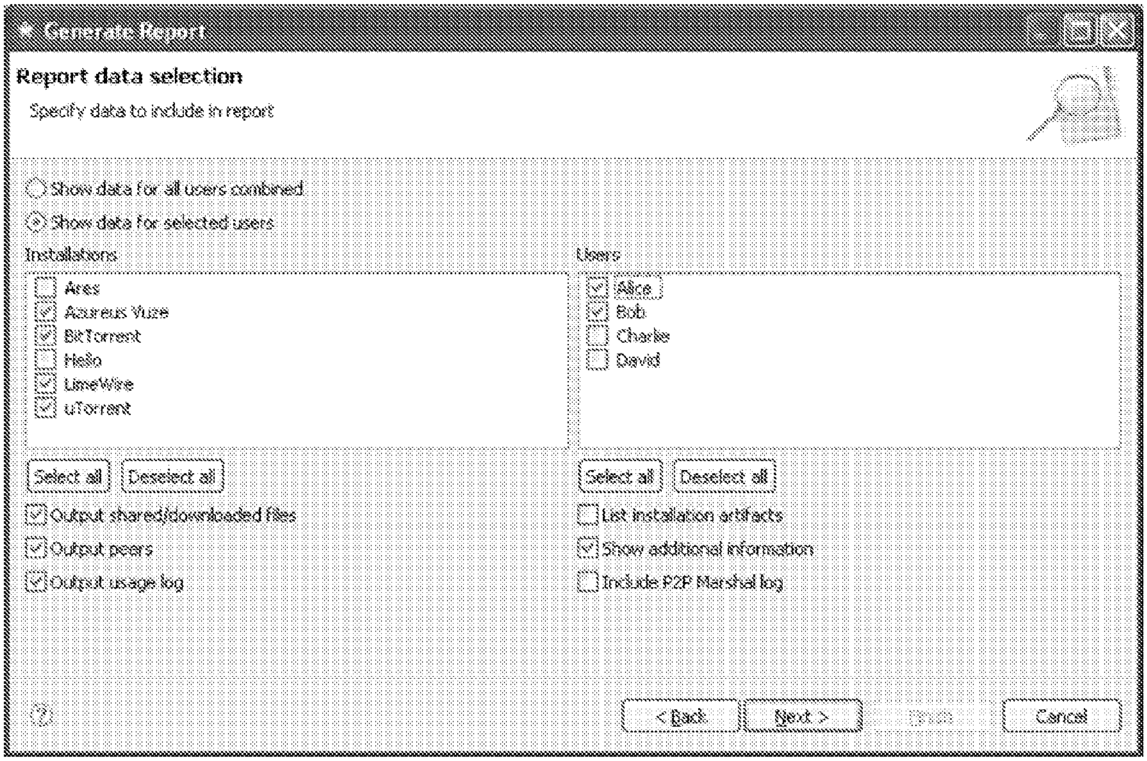

FIG. 13 is an exemplary user interface of data selection for generating a report, provided by user interface 26. The investigator may select whether the report should be separated by user, showing each client usage for each user, or group all users together within each discovered client. If "Show data for selected users" is selected, the investigator may then select which users to include in the report (by clicking on the checkbox by each user's name). Similarly, there may be a checkbox for each client, allowing the investigator to select which clients to include in the report. The select all and deselect all buttons may be shortcuts to checking or unchecking all of the corresponding boxes. Other checkbox options allow the investigator to select whether the list of peers, the list of downloaded and shared files, and usage logs should be included. Additionally, the investigator may select whether a list of all users, the audit log, and installation artifacts should be included.

Figure 14:
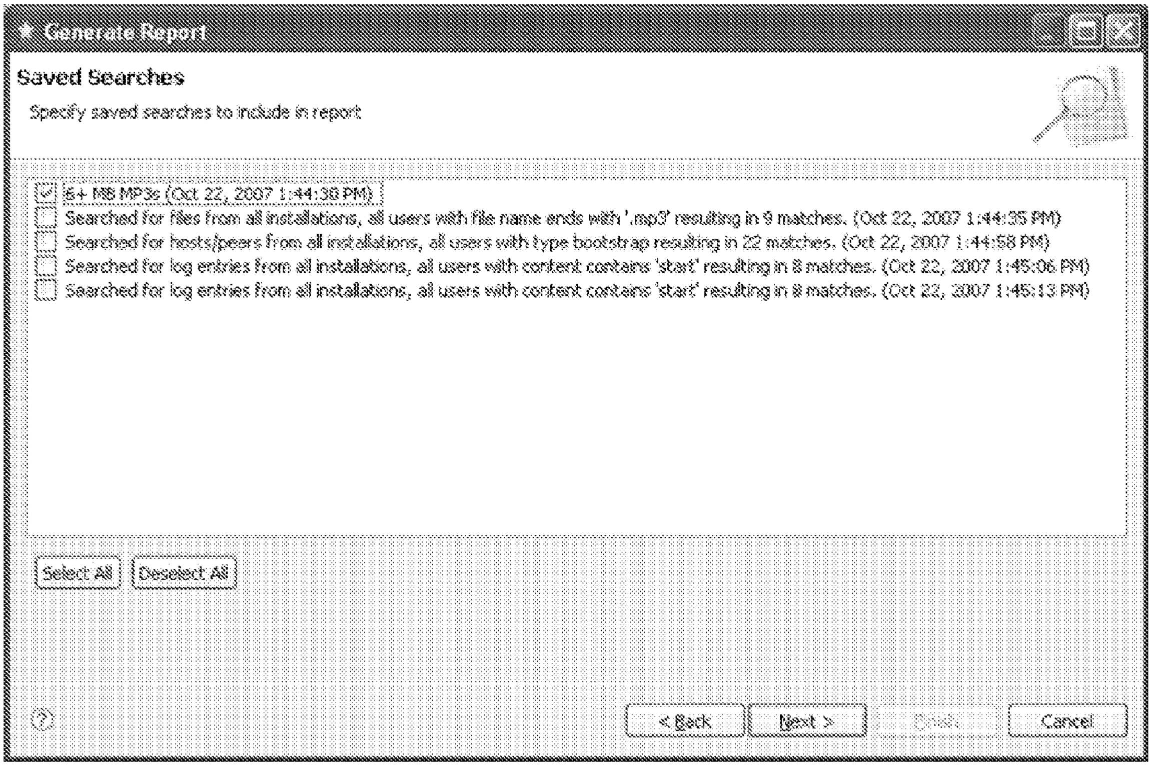

FIG. 14 is an exemplary user interface of previously executed and saved searches for the purpose of choosing whether to include them in the report, provided by user interface 26. The investigator may select any saved searches to include. If no searches were saved, this page may be skipped. After selecting all the necessary information, the investigator may then generate the report. The investigator may generate the report in formats known in the art, for example a PDF, HTML files, or the like. In addition, in some embodiments the investigator may be able to search the acquired and processed usage data as described in more detail below.

Figure 15:
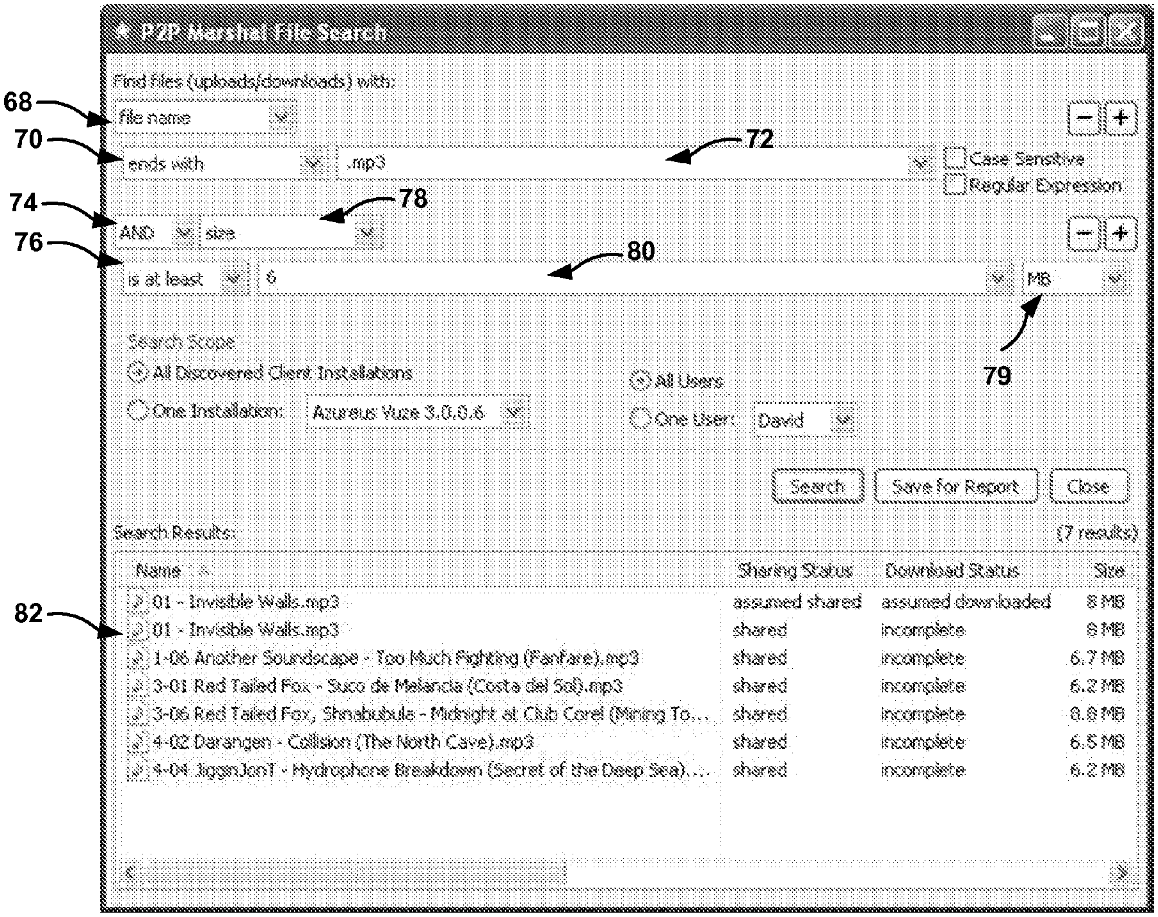
FIG. 15 is an exemplary user interface for search capabilities provided to an investigator.

FIG. 15 is an exemplary user interface for search capabilities provided to an investigator. The investigator may search for particular usage data that was acquired and processed. For example, the investigator can search for the files that were downloaded or shared, peer servers contacted by target device 18, and log entries stored on target device 18, to name a few examples. The investigator can search for the usage data based on various characteristics. For example, the investigator can search for the usage data based on file size, IP address, and the like.

The search interface provided in FIG. 15 is user-friendly and may use generally accepted search terms, according to one embodiment. Some examples of search terms include, but are not limited to, file name, sharing status, download status, size, modification time, and the like. The investigator may also search based on a directory of peer servers. The directory of peer servers may include IP addresses, hostnames of servers that were contacted, peer client type, and the like. The investigator may also search based on log entries, such as, for example, time of entry and/or text of entry.

As shown in FIG. 15, the investigator may use pull-down menu 68 and/or pull-down menu 78 to specify whether he or she desires to search for a file based on file name and/or file size. In some cases, the investigator may use only one of pull-down menu 68 or pull-down menu 78 to search for specific usage data. In some other cases, the investigator may use both pull-down menu 68 and pull-down menu 78 to search for specific usage data. In embodiments where the investigator uses both pull-down menu 68 and pull-down menu 78, the investigator may use pull-down menu 68 to search for usage data based on file name, and may use the other pull-down menu 78 to search for usage data based on file size. The investigator can select which pull-down menu to use by selecting the appropriate designation in pull-down menu 74. Pull-down menu 74 may include selectable options for "AND" and "OR" operations.

The investigator uses input field 72 and input field 80 to input particular search criteria. For example, as shown in FIG. 15, the investigator can select the "file name" option from pull-down menu 68 and "ends with" option from pull-down menu 70, and then input a file extension (".mp3") in input field 70. The investigator may further limit the search, as shown in FIG. 15, by selecting the "AND" option from pull-down menu 74, the "size" option from pull-down menu 78, and the "is at least" option from pull-down menu 76. The investigator may input a file size ("6") in input field 80, and define that the file size is in mega-bytes by selecting "MB" from pull-down menu 79. In some cases, the investigator may input the values into input fields 72 and 80 by selecting the values from pull-down menus associated with input fields 72 and 80.

Generally, if the investigator chooses to search for usage data based on a specific file name, the investigator may directly enter a file name by typing the name into input field 72 or input field 80, assuming that the investigator selected to search based on a file name in either pull-down menu 68 or pull-down menu 78. Or, if the investigator chooses to search for usage data based on a file size, the investigator may type in the file size into input field 72 or input field 80 assuming that the investigator selected to search based on a file size in either pull-down menu 68 or pull-down menu 78.

When searching for a file name, log entry text, and the like, the investigator may use string searches. The investigator may type in a string in either input field 72 or input field 80. The investigator may enter a string, and then select one or more criteria to specify how the search function is to use the string when searching for usage data. The investigator may specify the one or more criteria in a variety of ways. For example, the investigator may specify that the search should find an exact match for the string. Or, in some cases, the investigator may specify that the search should find all matches to the usage data where the usage data contains, beings with, or ends with the string entered into input field 72 or input field 80. In certain cases, the investigator may specify one or more search criteria to find usage data that does not contain, does not being with, or does not end with the entered string. As shown in FIG. 15, in one example embodiment, the investigator may specify that one search criterion is to search for any file name that ends with ".mp3" by selecting the appropriate options from pull-down menu 68, 70, and 72. The investigator selects the type of string search based on pull-down menu 70 or pull-down menu 76.

When searching for time of entry, and the like, the investigator may search for particular log entries based on a "is after" or "is before" criterion. For example, the investigator search for all log entries made after a particular point in time, or alternatively, search all log entries made before this particular point in time. In some embodiments, the investigator may limit the time or date range for the search. For example, the investigator may search for log entries after a first point in time, but before a second, subsequent point in time.

When searching based on file size, the investigator may use standard numeric comparisons such as equal to, less than, and greater than. For example, the investigator may search for a file whose file size is exactly equal to ten megabytes. Or, the investigator may search for a file whose file size is less than or greater than ten megabytes. The investigator may use pull-down menu 76, for example, to select a numeric comparison criterion, assuming the investigator selected to search based on the file size in pull-down menu 78.

After the investigator inputs all the search criteria, the search interface displays the result of the search. For example, as shown in FIG. 15, the search result is displayed in the search result field 82. As shown in FIG. 15, search result field 82 may display the file name, sharing status, download status, and file size for each search result that satisfies the one or more search criteria. After performing one or more searches, the investigator can review the search results shown in search result field 82.

Figure 16:
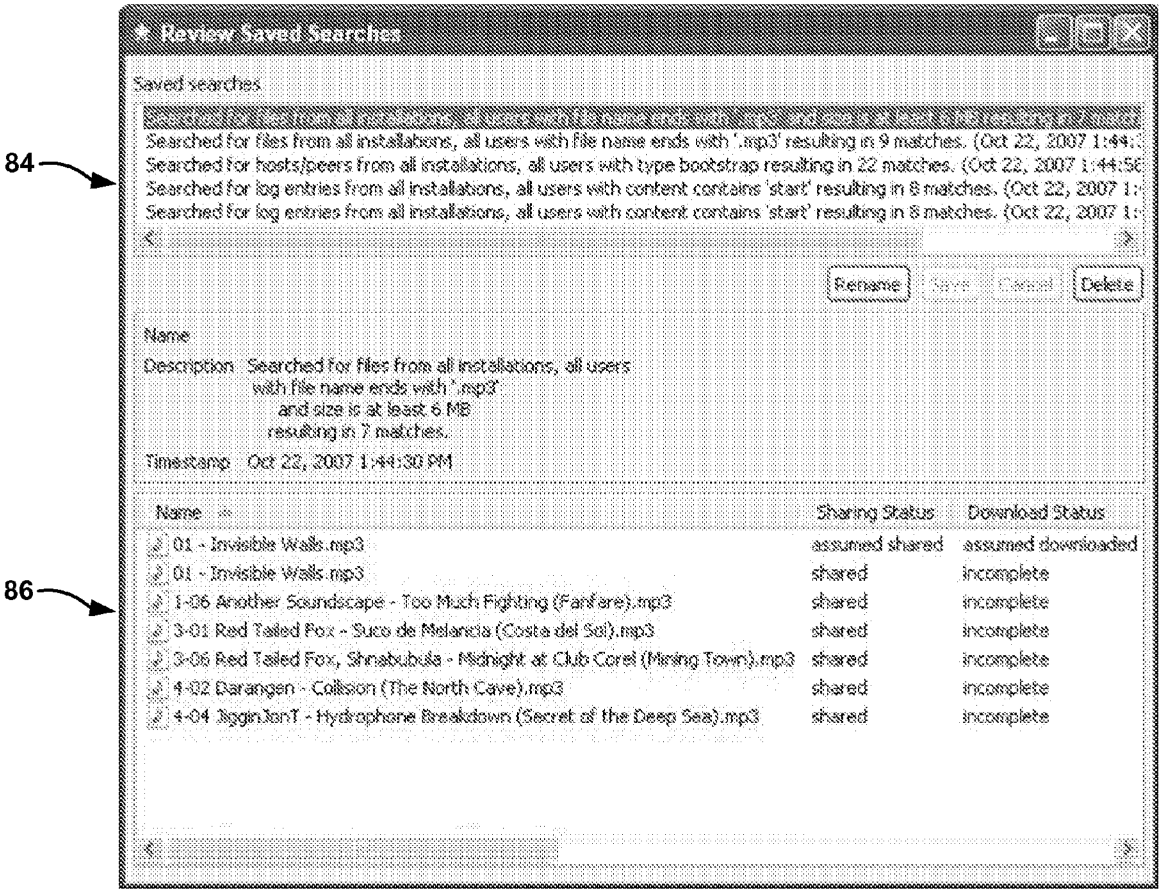
FIG. 16 is an exemplary user interface for reviewing previously searched usage data.

FIG. 16 is an exemplary user interface of a review of previously searched usage data. As shown in FIG. 16, the investigator can review all the performed searches and the criteria used for the searches, according to one embodiment. For example, field 84 displays criteria of all the previously performed and saved searches. The investigator may select any of the previously performed searches, and field 86 displays the results of the search. As shown in FIG. 16, field 86 may display the file name, sharing status, and download status. In some embodiments, field 86 may also display the file size in addition to the file name, sharing status, and download status.

In some embodiments, the techniques of this disclosure may be embodied on a computer-readable medium that stores data as described herein, and that may also contain instructions that cause one or more processors to perform various acts, such as those described herein. Computer-readable medium includes computer storage media. A storage media may be any available media that can be accessed by a computer. By way of example, and not limitation, such computer-readable media may comprise volatile memory such as various forms of random access memory (RAM) including dynamic random access memory (DRAM), synchronous dynamic random access memory (SDRAM), static random access memory (SRAM). Computer-readable media may also comprise a combination of volatile and non-volatile memory (such as flash memory), where the computer may read from the non-volatile memory and read from and write to the volatile memory.

Various embodiments have been described in the disclosure. The various techniques described above may automatically detect and analyze P2P client use on a target device. These techniques automate what may otherwise be a manual and labor intensive process. The described systems may be fully extensible for new or modified P2P clients. The described systems may maintain forensic integrity by generating a log of all actions taken. These and other examples are within the scope of the following claims.

The invention claimed is:

1. A non-transitory computer-readable medium comprising instructions that cause one or more processors, in a forensics device, to:

determine, with an analysis control module executing on the forensics device, whether two or more peer-to-peer clients are or have been installed on a target device by identifying usage information associated with two or more peer-to-peer modules installed on the forensics device, wherein each of the peer-to-peer clients corresponds to a different one of a plurality of peer-to-peer file sharing protocols, wherein each of the peer-to-peer modules installed on the forensics device provides configuration data, to the analysis control module, for a corresponding one of the peer-to-peer file sharing protocols to determine whether a peer-to-peer client associated with that peer-to-peer file sharing protocol is or has been installed on the target device, and wherein the configuration data from each of the peer-to-peer modules configures the analysis control module to detect and extract the specific usage information from the target device for the corresponding peer-to-peer client;

gather, with the analysis control module, the usage information for the peer-to-peer clients that had been determined to be installed on the target device based on the configuration data provided by the peer-to-peer modules installed on the forensics device;

analyze the gathered usage information for the peer-to-peer clients that had been determined to be installed on the target device; and generate a report of the analyzed gathered usage information for the peer-to-peer clients that had been determined to be installed or had been installed on the target device.

2. A method comprising:

determining, with an analysis control module executing on a forensics device, whether two or more peer-to-peer clients are or have been installed on a target device by identifying usage information associated with two or more peer-to-peer modules installed on the forensics device, wherein each of the peer-to-peer clients corresponds to a different one of a plurality of peer-to-peer file sharing protocols, wherein each of the peer-to-peer modules installed on the forensics device provides configuration data, to the analysis control module, for a corresponding one of the peer-to-peer file sharing protocols to determine whether a peer-to-peer client associated with that peer-to-peer file sharing protocol is or has been installed on the target device, and wherein the configuration data from each of the peer-to-peer modules configures the analysis control module to detect and extract specific usage information from the target device for the corresponding peer-to-peer client;

gathering, with the analysis control module, the usage information for the peer-to-peer clients that had been determined to be installed on the target device based on the configuration data provided by the peer-to-peer modules installed on the forensics device;

analyzing, the gathered usage information for the peer-to-peer clients that had been determined to be installed on the target device; and automatically generating, a report of the analyzed gathered usage information for the peer-to-peer clients that had been determined to be installed or had been installed on the target device.

3. The method of claim 2, wherein determining whether the peer-to-peer clients are or have installed on the target device comprises analyzing data fields in a configuration file associated with the peer-to-peer modules, wherein the data fields describe items to be searched on the target device.

4. The method of claim 3, wherein the configuration file is an extensible markup language (XML) file.

5. The method of claim 3, wherein the configuration file comprises client data, installation artifacts, and usage artifacts.

6. The method of claim 5, wherein the client data identifies a name and a version of the peer-to-peer client, and a name of a peer-to-peer plug-in associated with the peer-to-peer client.

7. The method of claim 5, wherein the installation artifacts comprises at least one of files, directories, and registry keys indicating that the peer-to-peer clients are or have been installed on the target device.

8. The method of claim 5, wherein the usage artifacts comprise at least one of log, setup, cache, and shared files and directories.

9. The method of claim 2, wherein the usage information comprises at least one of configuration and log information for the peer-to-peer file sharing protocols, peer servers contacted by the target device, files downloaded by the target device, and files shared by the target device.

10. The method of claim 2, wherein analyzing the gathered usage information comprises at least one of displaying the gathered usage information by launching an appropriate viewer, displaying details of configuration and log entries, and searching for files.

11. The method of claim 10, wherein searching for files comprises searching for files based on at least one of a set of hashes, a file name, a download and sharing status, a modification time, a user that downloaded or is sharing at least one of the files, and a peer-to-peer client that downloaded or is sharing at least one of the files.

12. The method of claim 2, wherein the report comprises at least one of an audit log and a summary report.

13. The method of claim 2, wherein the target device is at least one of a desktop computer, a laptop computer, a personal digital assistant (PDA), a handheld device, a hard drive, memory storage, copy of memory storage of a computing device, and image of memory storage of a computing device.

14. A forensic system comprising:

a forensic device coupled to a target device; and a software tool comprising an analysis module, executable by the forensic device to analyze and extract data from the target device, wherein the software tool, when executed, determines whether two or more peer-to-peer clients are or have been installed on a target device by identifying usage information associated with two or more peer-to-peer modules installed on the forensics device, wherein each of the peer-to-peer clients corresponds to a different one of a plurality of peer-to-peer file sharing protocols, wherein each of the peer-to-peer modules installed on the forensics device provides configuration data, to the analysis control module, for a corresponding one of the peer-to-peer file sharing protocols to determine whether a peer-to-peer client associated with that peer-to-peer file sharing protocol is or has been installed on the target device, and wherein the configuration data from each of the peer-to-peer modules configures the analysis control module to detect and extract specific usage information from the target device for the corresponding peer-to-peer client, wherein the software tool further gathers the usage information for the peer-to-peer clients that had been determined to be installed on the target device based on the configuration data provided by the peer-to-peer modules installed on the forensics device, wherein the software tool further analyzes the gathered usage information for the peer-to-peer clients that had been determined to be installed on the target device, and generates a report of the analyzed gathered usage information for the peer-to-peer clients that had been determined to be installed or had been installed on the target device.

15. The forensic system of claim 14, wherein the forensic device is at least one of a desktop computer, a laptop computer, a personal digital assistant (PDA), and a handheld device.

16. The forensic system of claim 14, wherein the target device is at least one of a desktop computer, a laptop computer, a personal digital assistant (PDA), a handheld device, a hard drive, memory storage, copy of memory storage of a computing device, and image of memory storage of a computing device.

17. The forensic system of claim 14, wherein the software tool is installed on the target device making the forensic device a part of the target device.

18. The forensic system of claim 14, wherein the software tool determines whether the peer-to-peer clients are or have been installed on the target device by analyzing data fields in a configuration file associated with the peer-to-peer modules, wherein the data fields describe items to be searched on the target device.

19. The forensic system of claim 18, wherein the configuration file is an extensible markup language (XML) file.

20. A forensic device comprising:

two or more peer-to-peer modules installed on the forensic device;

an analysis control module executing on the forensic device and configured to determine whether two or more peer-to-peer clients are or have been installed on a target device by identifying usage information associated with the peer-to-peer modules, wherein each of the peer-to-peer clients corresponds to a different one of a plurality of peer-to-peer file sharing protocols, wherein each of the peer-to-peer modules installed on the forensics device provides configuration data, to the analysis control module, for a corresponding one of the peer-to-peer file sharing protocols to determine whether a peer-to-peer client associated with that peer-to-peer file sharing protocol is or has been installed on the target device, and wherein the configuration data from each of the peer-to-peer modules configures the analysis control module to detect and extract specific usage information from the target device for the corresponding peer-to-peer client;

the analysis control module further configured to gather the usage information for the peer-to-peer clients that had been determined to be installed on the target device based on the configuration data provided by the peer-to-peer modules installed on the forensic device; and a storage unit that store the gathered usage information from the analysis control module.

21. The forensic device of claim 20 further comprising at least one configuration file associated with the peer-to-peer modules that includes data fields, wherein the at least one configuration file comprises client data, installation artifacts, and usage artifacts.

22. The forensic device of claim 21, wherein the client data identifies a name and a version of the peer-to-peer client, and a name of a peer-to-peer plug-in associated with the peer-to-peer client.

23. The forensic device of claim 21, wherein the installation artifacts comprise at least one of files, directories, and registry keys that indicate that the peer-to-peer clients are or have been installed on the target device.

24. The forensic device of claim 21, wherein the usage artifacts comprise at least one of log, setup, cache, and shared files and directories.

25. The forensic device of claim 21, wherein the at least one configuration file is an extensible markup language (XML) file.

26. The forensic device of claim 20, wherein the storage unit is at least one of hard drive and random access memory (RAM).

* * * * *